US011865462B2

(12) United States Patent
Nakamura et al.

(10) Patent No.: US 11,865,462 B2
(45) Date of Patent: Jan. 9, 2024

(54) COMMUNICATION SYSTEM, SERVER AND INFORMATION-PROCESSING METHOD

(71) Applicant: NINTENDO CO., LTD., Kyoto (JP)

(72) Inventors: Daisuke Nakamura, Kyoto (JP); Masashi Seiki, Kyoto (JP); Yosuke Fujino, Kyoto (JP); Miki Murakami, Kyoto (JP); Hideaki Tanabe, Kyoto (JP); Sho Onuma, Kyoto (JP); Naoya Hirota, Kyoto (JP); Kojiro Taguchi, Kyoto (JP); Daisuke Tsujimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/664,533

(22) Filed: May 23, 2022

(65) Prior Publication Data
US 2022/0280876 A1 Sep. 8, 2022

Related U.S. Application Data

(63) Continuation of application No. 16/790,483, filed on Feb. 13, 2020, now Pat. No. 11,369,886, which is a (Continued)

(30) Foreign Application Priority Data

Jun. 13, 2017 (JP) .............................. JP2017-115984

(51) Int. Cl.
*A63F 13/87* (2014.01)
*A63F 13/77* (2014.01)
(Continued)

(52) U.S. Cl.
CPC ............ *A63F 13/87* (2014.09); *A63F 13/215* (2014.09); *A63F 13/31* (2014.09); *A63F 13/352* (2014.09);
(Continued)

(58) Field of Classification Search
CPC ...... A63F 13/795; A63F 13/12; A63F 13/332; A63F 13/87
See application file for complete search history.

(56) References Cited

U.S. PATENT DOCUMENTS 7,926,095 B1 4/2011 Weiner
8,059,809 B1 11/2011 Zhang
(Continued)

FOREIGN PATENT DOCUMENTS

EP 2 006 003 12/2008
JP 2005-332187 A 12/2005
(Continued)

OTHER PUBLICATIONS

Splatoon 2 voice chat details—lobbies, social media interaction, cannot chat with strangers. GoNintendo.com. Online. Feb. 1, 2017. Acccessed via the Internet. Accessed Sep. 6, 2023. <URL: https://gonintendo.com/stories/273106-splatoon-2-voice-chat-details-lobbies-social-media-interaction> (Year: 2017).*

(Continued)

*Primary Examiner* — Dmitry Suhol
*Assistant Examiner* — Carl V Larsen
(74) *Attorney, Agent, or Firm* — Nixon & Vanderhye P.C.

(57) ABSTRACT

Exemplary communication system 1 includes game devices 10, communication terminals 20, and game support server 30. Game devices 10 enable users to perform a multi-play activity. Each of communication terminals 20 runs an application associated with corresponding game device 10. Game support server 30 divides communication terminals 20 into separate communication groups in accordance with a situation of the multi-play activity performed by game devices 10 so that communication terminals 20 belonging to a same communication group can communicate with each other.

17 Claims, 13 Drawing Sheets

Related U.S. Application Data continuation of application No. 15/889,472, filed on Feb. 6, 2018, now Pat. No. 10,596,473.

(51) Int. Cl.

| | | |
|---|---|---|
| *A63F 13/73* | (2014.01) | |
| *A63F 13/822* | (2014.01) | |
| *A63F 13/352* | (2014.01) | |
| *A63F 13/795* | (2014.01) | |
| *A63F 13/31* | (2014.01) | |
| *A63F 13/847* | (2014.01) | |
| *A63F 13/215* | (2014.01) | |
| *A63F 13/92* | (2014.01) | |
| *A63F 13/798* | (2014.01) | |
| *H04L 65/403* | (2022.01) | |
| *H04L 67/131* | (2022.01) | |
| *A63F 13/332* | (2014.01) | |
| *A63F 13/32* | (2014.01) | |
| *A63F 13/335* | (2014.01) | |

(52) U.S. Cl.
CPC .............. *A63F 13/73* (2014.09); *A63F 13/77* (2014.09); *A63F 13/795* (2014.09); *A63F 13/798* (2014.09); *A63F 13/822* (2014.09); *A63F 13/847* (2014.09); *A63F 13/92* (2014.09); *H04L 65/403* (2013.01); *H04L 67/131* (2022.05); *A63F 13/32* (2014.09); *A63F 13/332* (2014.09); *A63F 13/335* (2014.09)

(56) References Cited

U.S. PATENT DOCUMENTS

| | | | |
|---|---|---|---|
| 9,426,276 B2 | 8/2016 | He | |
| 2004/0198498 A1 | 10/2004 | Yamashita | |
| 2005/0086301 A1* | 4/2005 | Eichler | A63F 13/358 |
| | | | 709/204 |
| 2007/0099703 A1 | 5/2007 | Terebilo | |
| 2008/0274810 A1* | 11/2008 | Hayashi | A63F 13/795 |
| | | | 463/43 |
| 2009/0276529 A1 | 11/2009 | Ivory | |
| 2009/0291761 A1 | 11/2009 | Hata | |
| 2010/0035686 A1 | 2/2010 | Nakashima | |
| 2010/0093442 A1* | 4/2010 | Yoshinobu | A63F 13/285 |
| | | | 463/43 |
| 2010/0113160 A1 | 5/2010 | Belz | |
| 2011/0086711 A1 | 4/2011 | Dunko | |
| 2011/0098117 A1* | 4/2011 | Tanaka | A63F 13/87 |
| | | | 463/42 |
| 2012/0110099 A1* | 5/2012 | Fujihara | H04L 12/1818 |
| | | | 709/206 |
| 2012/0129591 A1 | 5/2012 | Jahanshahi | |
| 2015/0038235 A1 | 2/2015 | Kamekawa | |
| 2016/0236098 A1* | 8/2016 | Chibrikov | A63F 13/35 |
| 2017/0291111 A1* | 10/2017 | Chandrasekaran | A63F 13/35 |

FOREIGN PATENT DOCUMENTS

| | | |
|---|---|---|
| JP | 2007-301037 A | 11/2007 |
| JP | 2010-35908 | 2/2010 |
| JP | 2012-40055 A | 3/2012 |
| JP | 2013-111088 A | 6/2013 |
| JP | 2015-027369 A | 2/2015 |
| JP | 2015-100372 A | 6/2015 |
| WO | 2007/032364 A1 | 3/2007 |

OTHER PUBLICATIONS

Extended European Search Report issued by the EPO for EP Application No. 18153842 dated Jul. 3, 2018 (6 pages).

Japanese Office Action and machine English translation for Japanese Appln. No. 2017-115984, eight pages, dated Mar. 9, 2021.

Nintendo Switch Featured Functions & Services, Weekly Famitsu, Kadokawa Co., Ltd., Feb. 23, 2017, vol. 32, No. 10, p. 46.

Microsoft: "Xbox Xboc App (xbox.com)", Jun. 8, 2017 (Jun. 8, 2017), XP055492036, Retrieved from the Internet: <URL:https://web.archive.org/web/20170608225329/https://www.xbox.com/en-US/xbox-app> [retrieved on Jul. 12, 2018], seven pages.

Annonymous: "Xbox (software)—Wikipedia", Jun. 2, 2017 (Jun. 2, 2017), XP055492042. retrieved from the Internet: <URL:https://en.wikipedia.org/w/index.php? title=Xbox_(software)&oldid=783538225> [retrieved on Jul. 12, 2018], four pages.

Office Action issued by the EPO for corresponding European Patent Application No. 18153842.2, six pages, dated Jun. 25, 2021.

Private Matches and Supremacy Guide! Planetdestiny.pcinvasion. com. Online. Aug. 16, 2016. Accessed via the Internet. Accessed Jun. 5, 2021. <URL: https://planetdestiny.pcinvasion.com/private-matches-supremacy/> (Year: 2016).

Splatoon (Splatoon), Twitter [online], dated Feb. 2017, <https://twitter.com/SplatoonJP/status/826766508487380993>; An explanation of relevance provided in English Translation of JP OA.

Splatoon (Splatoon), Twitter [online], dated Feb. 2017, <https://twitter.com/SplatoonJP/status/826766755523547138>; An explanation of relevance provided in English Translation of JP OA.

Japanese Office Action and machine English translation for Japanese Appln. No. 2021-204283, four pages (5 pages of translation), dated May 16, 2023.

NPL4[Splatoon] Let's fight together! Private match edition [splatoon commentary], <https://www.youtube.com/watch?v=_EHRLdQuzuk>, Youtube, Published Jun. 16, 2016, especially see timestamp: 9:46 - 15:31. An explanation of relevance provided in English Translation of JP OA.

* cited by examiner

| DEVICE ID | APPLICATION USER ID | MANAGEMENT-PURPOSE USER ID | USER NAME |
|---|---|---|---|
| D001 | A001 | M001 | A |
| D002 | A002 | M002 | B |
| ⋮ | ⋮ | ⋮ | ⋮ |

*FIG. 5*

| ROOM ID | ROOM NAME | ADDRESS INFORMATION | APPLICATION USER ID | |
|---|---|---|---|---|
| | | | HOST | GUEST |
| R001 | A ROOM | http://... | A001 | A010, A011, A012 |
| R002 | B ROOM | http://... | A002 | A020, A021, A022 |
| ⋮ | ⋮ | ⋮ | ⋮ | ⋮ |

*FIG. 6*

| APPLICATION USER ID | ROOM ID | CHANNEL ID | GROUP | CONNECTION INFORMATION |
|---|---|---|---|---|
| A001 | R001 | ch1 | α | ... |
| A010 | R001 | ch1 | α | ... |
| A011 | R001 | ch2 | β | ... |
| A012 | R001 | ch2 | β | ... |
| A002 | R002 | ch0 | — | ... |
| A020 | R002 | ch0 | — | ... |
| A021 | R002 | ch0 | — | ... |
| A022 | R002 | ch0 | — | ... |
| ⋮ | ⋮ | ⋮ | ⋮ | ⋮ |

*FIG. 7*

| DEVICE ID | USER NAME |
|---|---|
| D030 | E |
| D031 | F |
| ⋮ | ⋮ |

*FIG. 8*

| APPLICATION USER ID | USER NAME |
|---|---|
| A040 | G |
| A041 | H |
| ⋮ | ⋮ |

*FIG. 9*

COMMUNICATION SYSTEM, SERVER AND INFORMATION-PROCESSING METHOD

CROSS REFERENCE TO RELATED APPLICATIONS

This application is a continuation of U.S. patent application Ser. No. 16/790,483, filed Feb. 13, 2020, now allowed; which is a continuation of U.S. patent application Ser. No. 15/889,472, filed Feb. 6, 2018, now U.S. Pat. No. 10,596,473, issued Mar. 24, 2020; which claims priority to Japanese Patent Application No. 2017-115984, filed on Jun. 13, 2017, the entire contents of each being incorporated herein by reference.

FIELD

An exemplary embodiment relates to a technique for enabling communication between users playing a multi-player game together.

BACKGROUND AND SUMMARY

Known in the art are methods for enabling communication between users playing a multi-player game together.

A communication system according to an exemplary embodiment comprises plural communication terminals and one or more servers, wherein: the one or more servers comprise: first memory; and at least one first processor configured to: for each of plural game devices by use of which a multi-play is being performed, associate a game device with an application running in one of the plural communication terminals, using identification information of a user of the game device; acquire information on a situation of a game running in the plural game devices; generate, for each of the plural communication terminals, according to the situation of the game, information on a group forming a unit of communication; and for each of the plural communication terminals, send corresponding information on a group to a communication terminal based on established associations, each of the plural communication terminals comprises: second memory; and at least one second processor configured to perform, by executing the application, based on the information on a group sent from the one or more servers, communication with another communication terminal belonging to an identical group via a network.

The identification information of the user includes a device ID of the game device used by the user, a management-purpose user ID of the user, or an application user ID of the user.

BRIEF DESCRIPTION OF THE DRAWINGS

FIG. 5 is a diagram showing an example of user information DB 321.

FIG. 6 is a diagram showing an example of room information DB 322.

FIG. 7 is a diagram showing an example of game situation information DB 323.

FIG. 8 is a diagram showing an example of friend information DB 324.

FIG. 9 is a diagram showing an example of multi-play history DB 325.

DETAILED DESCRIPTION OF NON-LIMITING EXAMPLE EMBODIMENTS

1. Embodiment 1-1. Configuration
1-1-1. Configuration of Communication System 1

Figure 1:
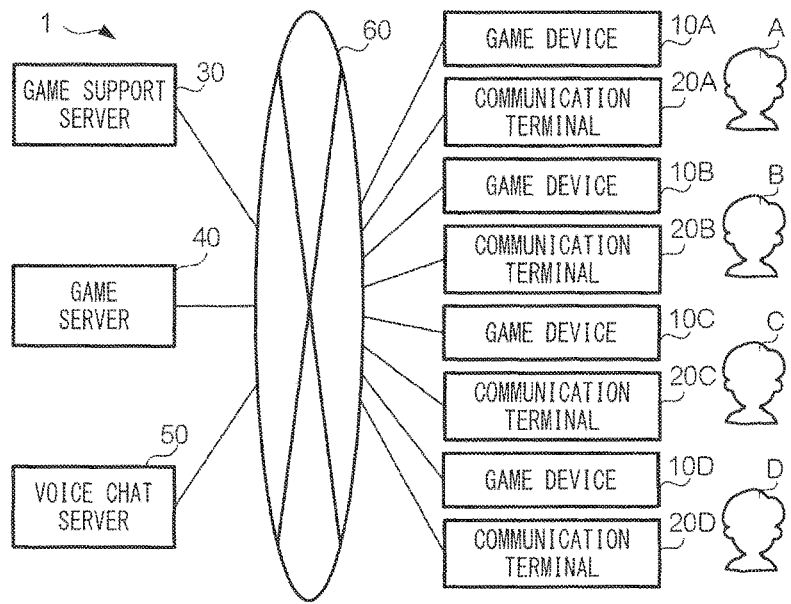
FIG. 1 is a diagram showing an example of a configuration of communication system 1.

FIG. 1 is a diagram showing an example of a configuration of communication system 1 according to an embodiment of the present invention. Communication system 1 includes game devices 10A to 10D, which will hereinafter be referred to as "game device 10" except where it is necessary to specify otherwise, communication terminals 20A to 20D, which will hereinafter be referred to as "communication terminal 20" except where it is necessary to specify otherwise, game support server 30, game server 40, and voice chat server 50. The components of communication system 1 are connected with each other via communication line 60, such as the Internet, a LAN, or a mobile communication network. In communication system 1, game device 10A and communication terminal 20A are used by user A, game device 10B and communication terminal 20B are used by user B, game device 10C and communication terminal 20C are used by user C, and game device 10D and communication terminal 20D are used by user D. It is to be noted that in the present embodiment a case is assumed that four sets of game devices 10 and communication terminals 20 are used respectively by four users; however, the number of users and devices is not limited to four.

1-1-2. Configuration of Game Device 10

Game device 10 is a portable computer game device with a communication function, by use of which a user can participate in a multi-play activity. A multi-play activity herein refers to playing a game together by plural users via a communication network. Users who wish to participate in a multi-play activity enter a virtual room to participate in a multi-play activity on a room-by-room basis. Multi-player games include, for example, a collaborative game and a battle game.

Game device 10 is a terminal that is not always connected to communication line 60. In principle, game device 10 connects to communication line 60 in response to a user's explicit input operation requiring connection. Also, in a case where game device 10 automatically connects to communication line 60, without awaiting a user's input operation, the game device automatically terminates the connection to the communication line after executing processing that has triggered the connecting operation.

Figure 2:
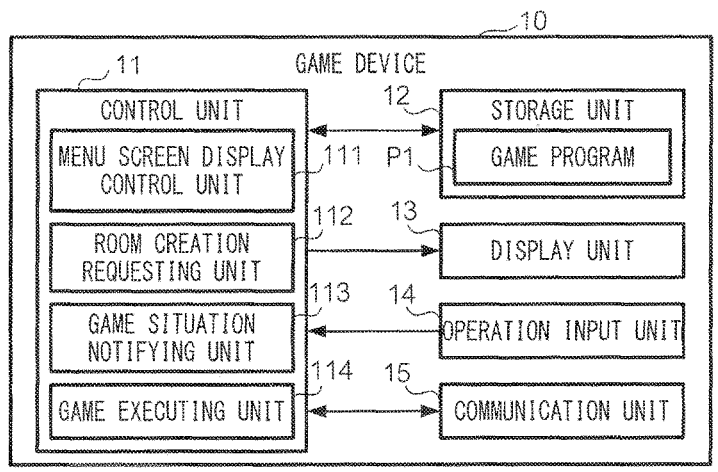
FIG. 2 is a diagram showing an example of a configuration of game device 10.

FIG. 2 is a diagram showing an example of a configuration of game device 10, which includes control unit 11, storage unit 12, display unit 13, operation input unit 14, and communication unit 15. It is to be noted that in a modification, storage unit 12 may be a detachable external storage medium.

Control unit 11 includes a processor such as a CPU or GPU, and a volatile memory, which unit executes programs stored in storage unit 12. Functions provided by control unit 21 through execution of programs will be described later.

Storage unit 12 is a storage device such as a flash memory, which unit stores programs to be executed by control unit 11. Programs stored in storage unit 12 include game program P1, which is a program of multi-player battle game G. Battle game G is a game in which groups of users battle against each other. In battle game G, a user's desired number of matches (or competitions) is consecutively performed, and for each match a grouping of users is manually or randomly performed.

Now, display unit 13 is a display device such as a liquid crystal display or an organic EL display.

Operation input unit 14 is an input device such as a touch sensor placed on top of display unit 13, an arrow key, or an analog stick.

Communication unit 15 is a communication module for enabling communication with game support server 30 or game server 40. For example, communication unit 15 connects to a wireless LAN access point in accordance with an IEEE802.11 standard such as IEEE802.11.b/g, thereby communicating with game support server 30 or game server 40 via communication line 60.

Control unit 11, by executing game program P1 stored in storage unit 12, provides functions of menu screen display control unit 111, room creation requesting unit 112, game situation notifying unit 113, and game executing unit 114.

Menu screen display control unit 111, on receiving a user's instruction to display a menu screen, sends a room information request including a device ID, which is identification information of game device 10, to game support server 30. Subsequently, on receiving room information sent from game support server 30, menu screen display control unit 111 causes display unit 13 to display a menu screen (see FIG. 12 or 21) based on the received room information. Subsequently, on receiving a user's selection of a desired room on the menu screen, menu screen display control unit 111 causes display unit 13 to display a confirmation screen for confirming whether a user wishes to use a voice chat.

Room creation requesting unit 112, on receiving a user's selection of a room creation button on a menu screen, sends a room creation request including a device ID of game device 10 to game support server 30. Subsequently, on receiving a completion notice notifying that a room has been created, room creation requesting unit 112 causes display unit 13 to display a completion screen (see FIG. 13) notifying that a room has been created. Subsequently, on receiving a user's selection of a notice request button on the completion screen, which button is used to request that a similar notice be sent to communication terminal 20 running game support program P2 associated with game device 10, room creation requesting unit 112 sends a notice request including a device ID of the game device to game support server 30.

Game situation notifying unit 113, on receiving a user's input operation performed in response to displaying of a confirmation screen for confirming whether the user wishes to use a voice chat, which input operation requests use of a voice chat, sends a room entry notice including a room ID, which is identification information of a room selected on a menu screen, and a device ID of game device 10, to game support server 30.

Also, game situation notifying unit 113, upon detecting necessity of a change of a channel ID after a multi-play activity starts, sends a group change notice including a device ID of game device 10 to game support server 30 as information on a situation of the multi-play activity. Channel ID herein refers to identification information for identifying a group of communication terminals 20 via which a voice chat is collectively performed. Situations requiring a change of channel IDs include, for example, a case in which grouping of users has been performed in battle game G, and another case in which a match has ended in the battle game. In the former case, a group ID, which is identification information of a group to which a user will belong, is included in a group change notice.

Also, game situation notifying unit 113, on receiving a user's instruction to end a multi-play activity, sends a room exit notice including a room ID of a room in which a user is present and a device ID of game device 10 to game support server 30.

Game executing unit 114, on receiving a user's input operation performed in response to displaying of a confirmation screen for confirming whether a user wishes to use a voice chat, which input operation requests use of a voice chat, sends a room entry request including a room ID of a room selected on a menu screen and a device ID of game device 10 to game server 40.

Also, game executing unit 114, on receiving a user's instruction to end a multi-play activity, sends a room exit notice including a room ID of a room in which a user is present and a device ID of game device 10 to game server 40 to end the multi-play activity.

1-1-3. Configuration of Communication Terminal 20

Communication terminal 20 is a portable computer device with a communication function, and is, for example, a mobile terminal such as a smartphone, a mobile phone, or a tablet device. Communication terminal 20 is a terminal always connected to communication line 60; specifically, communication terminal 20, in an environment that enables connection to communication line, always remains connected to the communication line so that the communication terminal can communicate at any time. Communication terminal 20, without awaiting a user's explicit input operation for connecting, automatically connects to communication line 60 so that the user can access the communication line whenever s/he needs to, without attention to a connection status.

Figure 3:
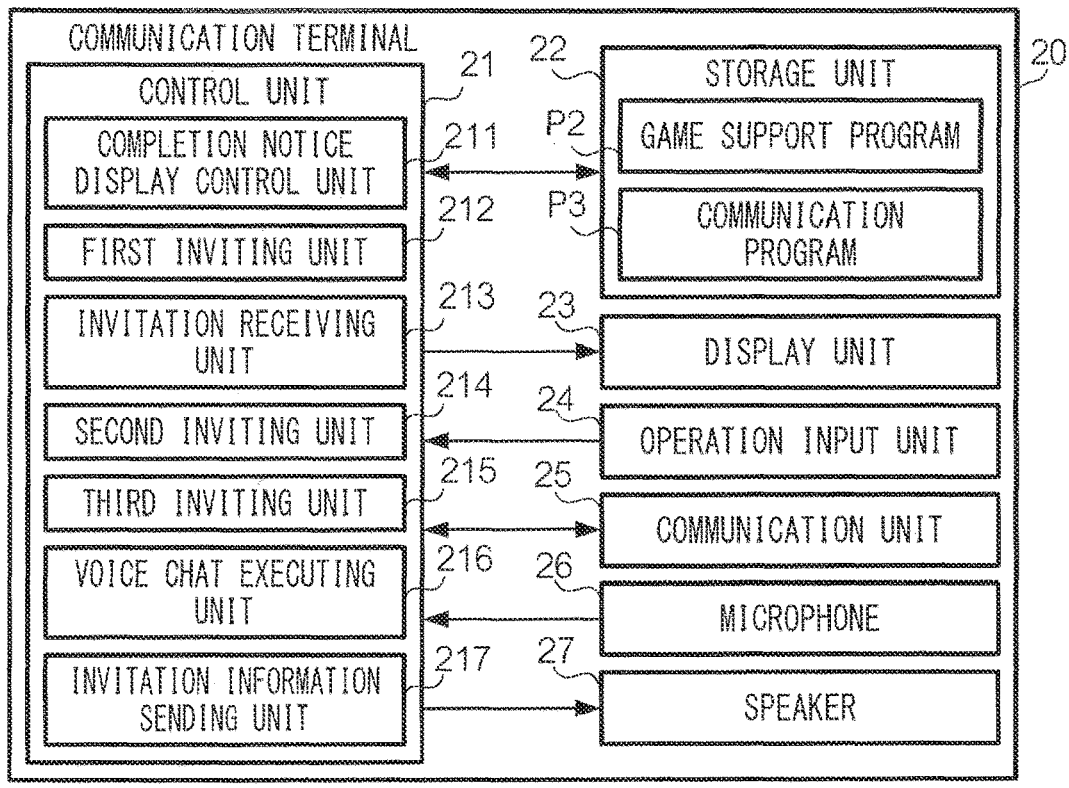
FIG. 3 is a diagram showing an example of a configuration of communication terminal 20.

FIG. 3 is a diagram showing an example of a configuration of communication terminal 20, which includes control unit 21, storage unit 22, display unit 23, operation input unit 24, communication unit 25, microphone 26, and speaker 27. It is to be noted that in a modification, storage unit 22 may be a detachable external storage medium.

Control unit 21 includes a processor such as a CPU or GPU, and a volatile memory, which unit executes programs stored in storage unit 22. Functions provided by control unit 21 through execution of programs will be described later.

Storage unit 22 is a storage device such as a flash memory, which unit stores programs to be executed by control unit 21. Programs stored in storage unit 22 include game support program P2 and communication program P3. Game support program P2 is an application program defining a procedure of operation for supporting multi-play of battle game G, which operation includes an operation for inviting another user to join a multi-play activity and a multi-play operation. Communication program P3 is a program defining a procedure of communication performed with another communication terminal 20, and is, for example, a mailer or a social networking service (SNS) application program.

Display unit 23 is a display device such as a liquid crystal display or an organic EL display.

Operation input unit 24 is an input device such as a touch sensor placed on top of display unit 23, or a numeric keypad.

Communication unit 25 is a communication module for enabling communication with game support server 30 or voice chat server 50. For example, communication unit 25 connects to a base station in a mobile communication network, thereby communicating with game support server 30 or voice chat server 50 via communication line 60. Alternatively, communication unit 25 connects to a wireless LAN access point in accordance with an IEEE802.11 standard such as IEEE802.11.b/g, thereby communicating with game support server 30 or voice chat server 50 via communication line 60.

Microphone 26 receives speech of a user of communication terminal 20 to generate and output speech information to control unit 21.

Speaker 27 outputs speech based on speech information output from control unit 21.

Control unit 21, by executing game support program P2 stored in storage unit 22, provides functions of completion notice display control unit 211, first inviting unit 212, invitation receiving unit 213, second inviting unit 214, third inviting unit 215, and voice chat executing unit 216.

Completion notice display control unit 211, on receiving a completion notice from game support server 30, notifying that a room has been created, causes display unit 23 to display a message notifying that a room has been created, and prompting a user to invite another user to the created room. Subsequently, on receiving a user's input operation, for example, to select the message, completion notice display control unit 211 causes display unit 23 to display an invitation method selection screen (see FIG. 14).

Also, completion notice display control unit 211, on receiving a completion notice from game support server 30, notifying that a user has been registered as a guest user in another user's room, causes display unit 23 to display a message notifying the fact.

First inviting unit 212, on receiving a user's selection of a selection button on an invitation method selection screen, which selection button indicates an invitation using communication program P3, sends an address information request including a room ID received from game support server 30 to the game support server. Subsequently, on receiving address information sent from game support server 30, first inviting unit 212 causes display unit 23 to display the received address information. The displayed address information may be sent to another communication terminal 20 by use of communication program P3 as invitation information for inviting a user of another game device 10 to a room. When sending the address information, first inviting unit 212 may start communication program P3 by use of a share function provided by an OS, thereby sending an invitation message including the displayed address information to another communication terminal 20.

Invitation receiving unit 213, on receiving a user's input operation performed in response to displaying of a confirmation screen for confirming whether a user accepts another user's invitation to a room, which input operation indicates a user's intention to accept the invitation, sends an invitation acceptance response including a room ID received from game support server 30 and an application user ID of the invited user to the game support server. An application user ID herein refers to identification information of a user using game support program P2 running on communication terminal 20. After sending the invitation acceptance response, and receiving a completion notice sent from game support server 30, notifying that the user has been registered as a guest user, invitation receiving unit 213 causes display unit 23 to display a completion screen notifying the fact.

Second inviting unit 214, on receiving a user's selection of a selection button on an invitation method selection screen, which selection button indicates a friend invitation, sends a friend information request including an application user ID of a user to game support server 30. Subsequently, on receiving friend information sent from game support server 30, second inviting unit 214 causes display unit 23 to display a friend list based on the received friend information. Subsequently, on receiving a user's selection of another user, second inviting unit 214 sends an invitation request including an application user ID of the selected user and a room ID received from game support server 30 to the game support server as invitation information for inviting the selected user to a room.

Third inviting unit 215, on receiving a user's selection of a selection button on an invitation method selection screen, which selection button indicates an invitation of another user with whom a user has performed a multi-play activity, sends a play history information request including an application user ID of the user to game support server 30. Subsequently, on receiving play history information sent from game support server 30, third inviting unit 215 causes display unit 23 to display a list of other users with whom the user has performed a multi-play activity, based on the received play history information. Subsequently, on receiving a user's selection of another user, third inviting unit 215 sends an invitation request including an application user ID of the selected user and a room ID received from game support server 30 to the game support server as invitation information for inviting the selected user to a room.

Voice chat executing unit 216, on receiving a room entry notice sent from game support server 30, sends a connection information request including an application user ID of a user to the game support server. Subsequently, on receiving connection information sent from game support server 30 and a user's input operation requesting start of a voice chat, voice chat executing unit 216 sends a voice chat start request including a set of a room ID and a channel ID, included in the room entry notice, and the application user ID of the user to voice chat server 50 by use of the received connection information. Connection information herein is information necessary to connect to voice chat server 50, and includes, specifically, a host name of the voice chat server and authentication information necessary to connect to the server. After sending the voice chat start request, voice chat executing unit 216 causes display unit 23 to display a message notifying that voice chat has become available.

Also, voice chat executing unit 216, on receiving, during a multi-play activity, a channel change notice sent from game support server 30, sends a connection information request including an application user ID of a user to the game support server. Subsequently, on receiving connection information sent from game support server 30, voice chat executing unit 216 sends a voice chat start request including a room ID of a room in which the user is present, a channel ID included in the channel change notice, and the application user ID of the user to voice chat server 50 by use of the received connection information.

Also, voice chat executing unit 216, on receiving a room exit notice sent from game support server 30, notifying that a user has exited a room, sends, after a lapse of a predetermined time period (for example, three minutes), a voice chat end notice including an application user ID of a user to voice chat server 50 to end a voice chat.

Control unit 21 also, by executing communication program P3 stored in storage unit 22, provides a function of invitation information sending unit 217, which sends an invitation message including address information acquired by first inviting unit 212 to another communication terminal 20.

1-1-4. Configuration of Game Support Server 30

Game support server 30 is a computer device for supporting game devices 10 to perform multi-play of battle game G. Game support server 30, specifically, supports game devices 10 to invite another user to join a multi-play activity and to perform communication during a multi-play activity. It is to be noted that game support server 30 may consist of a set of physically independent servers, a functional layout of which servers may be freely determined.

Figure 4:
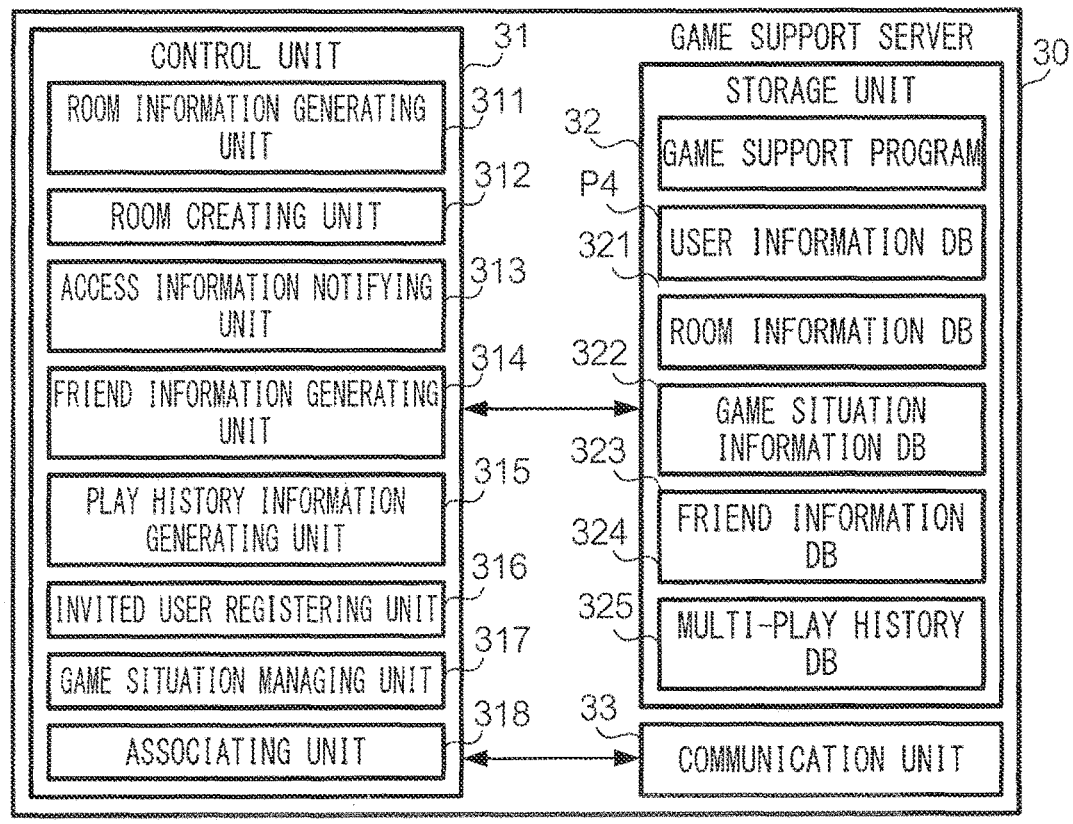
FIG. 4 is a diagram showing an example of a configuration of game support server 30.

FIG. 4 is a diagram showing an example of a configuration of game support server 30, which includes control unit 31, storage unit 32, and communication unit 33.

Control unit 31 includes a processor such as a CPU or GPU, and a volatile memory, which unit executes programs stored in storage unit 32. Functions provided by control unit 31 through execution of programs will be described later.

Storage unit 32 is a storage device such as a hard disk, which unit stores programs to be executed by control unit 31. Programs stored in storage unit 32 include game support program P4, which is an application program defining a procedure of operation for supporting game devices 10 to perform multi-play of battle game G, which operation includes an operation for inviting another user to join a multi-play activity and another operation for performing communication during a multi-play activity. Storage unit 32 also stores user information DB 321, room information DB 322, game situation information DB 323, friend information DB 324, and multi-play history DB 325.

FIG. 5 is a diagram showing an example of user information DB 321, which is a database for managing information on users of game devices 10 and communication terminals 20. Each record of user information DB 321 includes fields of a device ID of game device 10 used by a user, an application user ID of the user, a management-purpose user ID of the user, and a user name of the user. A management-purpose ID herein refers to identification information issued to a user who performs a multi-play activity.

By associating a device ID and an application user ID in user information DB 321, game device 10 identified by the device ID and game support program P2 identified by the application user ID are associated.

FIG. 6 is a diagram showing an example of room information DB 322, which is a database for managing information on created rooms. Each record of room information DB 322 includes fields of a room ID, a room name, address information, an application user ID of a host user who has created a room, and application user IDs of guest users who have been invited to the room. Address information herein refers to identification information identifying a storage location of data of a confirmation screen, which screen is used to confirm whether a user wishes to enter a room. Address information is, specifically, a uniform resource locator (URL) including a room ID or identification information generated based on the room ID in accordance with a predetermined rule.

FIG. 7 is a diagram showing an example of game situation information DB 323, which is a database for managing information on game situations including users' room entries. Each record of game situation information DB 323 includes fields of an application user ID, a room ID, a channel ID, a group ID, and connection information.

FIG. 8 is a diagram showing an example of friend information DB 324, which is a database for managing information on friends of users of game devices 10 and communication terminals 20, which friends have been registered using game device 10. Friend information DB 324 includes tables, each of which is created for each user, and stores sets of a device ID of game device 10 used by a friend and a user name of the friend.

A friendship herein refers to a relationship established based on a mutual agreement between users. A friendship is established under a condition that a user sends a friend request to another user to request establishment of a friendship, and the other user approves the friend request. Alternatively, a friendship is established under a condition that users exchange friend requests. Users who have become friends are able to share information with each other. For example, between friends using an SNS application, a user can automatically acquire a message posted by another user, or know whether the other user is logged in. Also, friends are able to participate in a game simultaneously. For example, friends are able to participate in battle play or collaborative play together, or to be listed with an identical, joint ranking.

FIG. 9 is a diagram showing an example of multi-play history DB 325, which is a database for managing information on other users with whom users of game devices 10 and communication terminals 20 have performed a multi-play activity, each of which other users has been registered using game device 10. Multi-play history DB 325 includes tables, each of which is created for each user, and stores sets of an application user ID and a user name of another user with whom a user has performed a multi-play activity.

Now, communication unit 33 is a communication module for enabling communication with game device 10 or communication terminal 20.

Control unit 31, by executing game support program P4 stored in storage unit 32, provides functions of room information generating unit 311, room creating unit 312, access information notifying unit 313, friend information generating unit 314, play history information generating unit 315, invited user registering unit 316, game situation managing unit 317, and associating unit 318.

Room information generating unit 311, on receiving a room information request sent from game device 10, generates room information with reference to room information DB 322. Specifically, room information generating unit 311, by referring to user information DB 321, identifies an application user ID corresponding to a device ID included in the received room information request, and, by referring to room information DB 322, identifies a set of a room ID and a room name, corresponding to the identified application user ID, as room information. After generating the room information, room information generating unit 311 sends the generated room information to game device 10.

Room creating unit 312, on receiving a room creation request sent from game device 10, creates a room. Specifically, first, room creating unit 312 generates a room ID and a room name. Room creating unit 312 generates a room name, for example, by adding a word "room" to a user name of a user. Second, room creating unit 312, by referring to user information DB 321, identifies an application user ID corresponding to a device ID included in the received room creation request. Third, room creating unit 312 generates address information including the room ID or identification information generated based on the room ID in accordance with a predetermined rule. Finally, room creating unit 312 stores in room information DB 322, the generated room ID and room name, the identified application user ID, and the generated address information in association with each other. After creating the room, room creating unit 312 sends a completion notice notifying that a room has been created, to game device 10. Subsequently, on receiving a notice request sent from game device 10, requesting that a completion notice be sent to communication terminal 20 running game support program P2 associated with the game device, room creating unit 312 sends a completion notice including the room ID of the created room to the communication terminal as a push notification.

Access information notifying unit 313, on receiving an address information request sent from communication terminal 20, sends requested address information to the communication terminal with reference to room information DB 322. Specifically, access information notifying unit 313, by referring to room information DB 322, identifies address information corresponding to a room ID included in the received address information request to send the identified address information to communication terminal 20.

Friend information generating unit 314, on receiving a friend information request sent from communication terminal 20, generates friend information with reference to friend information DB 324. Specifically, friend information generating unit 314, by referring to friend information DB 324, identifies device IDs and user names of friends as friend information. The identified device IDs are converted to corresponding application user IDs with reference to user information DB 321. After generating the friend information, friend information generating unit 314 sends the generated friend information to communication terminal 20.

Play history information generating unit 315, on receiving a play history information request sent from communication terminal 20, generates play history information with reference to multi-play history DB 325. Specifically, play history information generating unit 315, by referring to multi-play history DB 325, identifies application user IDs and user names of other users with whom a user has performed a multi-play activity as play history information. After generating the play history information, play history information generating unit 315 sends the generated play history information to communication terminal 20.

Invited user registering unit 316, on receiving an invitation acceptance response sent from communication terminal 20, stores, in room information DB 322, a set of a room ID and an application user ID, included in the received invitation acceptance response, so that a user identified by the application user ID is allowed to enter a room identified by the room ID. Subsequently, invited user registering unit 316 sends a completion notice notifying that the user has been registered as a guest user, to communication terminal 20.

Also, invited user registering unit 316, on receiving an invitation request sent from communication terminal 20, stores in room information DB 322, a set of a room ID and an application user ID, included in the received invitation request, so that a user identified by the application user ID is allowed to enter a room identified by the room ID. Subsequently, invited user registering unit 316 sends an invitation notice notifying that the user has been registered as a guest user, to communication terminal 20 used by the user registered as a guest user, as a push notification.

Game situation managing unit 317, on receiving a room entry notice sent from game device 10, registers in game situation information DB 323, information indicating that a user of the game device has entered a room. Specifically, game situation managing unit 317, by referring to user information DB 321, identifies an application user ID corresponding to a device ID included in the received room entry notice, and stores, in game situation information DB 323, the identified application user ID, a room ID included in the received room entry notice, a channel ID "ch0," and connection information in association with each other. After registering the room entry, game situation managing unit 317 sends a room entry notice including the room ID of the room that the user has entered, and the channel ID "ch0," to communication terminal 20 running game support program P2 associated with game device 10, as a push notification. Subsequently, on receiving a connection information request sent from communication terminal 20, game situation managing unit 317, by referring to game situation information DB 323, identifies connection information associated with an application user ID included in the received connection information request, to send the identified connection information to the communication terminal.

Also, game situation managing unit 317, on receiving a group change notice sent from game device 10 after a multi-play activity starts, updates a set of a group ID and a channel ID, stored in game situation information DB 323, based on the received group change notice. Specifically, first, game situation managing unit 317, by referring to user information DB 321, identifies an application user ID corresponding to a device ID included in the received group change notice, and stores, in game situation information DB 323, the identified application user ID and a group ID included in the received group change notice in association with each other. It is to be noted that, in a case where the received group change notice does not include a group ID; in other words, the group change notice is a notice notifying an end of a match, game situation managing unit 317 resets the group ID to default. Second, game situation managing unit 317 assigns a new channel ID to a user identified by the identified application user ID to update the group ID stored in game situation information DB 323 with the new channel ID. When doing so, game situation managing unit 317 assigns the new channel ID so that users sharing a group ID in a room share a channel ID. In a case where group IDs of users in a room have been reset to a default setting, game situation managing unit 317 assigns a channel ID "ch0" to all the users. After updating the group ID and the channel ID, game situation managing unit 317 sends a channel change notice notifying that a channel ID has changed, to communication terminal 20 running game support program P2 associated with game device 10. Subsequently, on receiving a connection information request sent from communication terminal 20, game situation managing unit 317, by referring to game situation information DB 323, identifies connection information associated with an application user ID included in the received connection information request to send the identified connection information to the communication terminal.

Also, game situation managing unit 317, on receiving a room exit notice sent from game device 10, deletes a record of a user of the game device from game situation information DB 323. Specifically, game situation managing unit 317, by referring to user information DB 321, identifies an application user ID corresponding to a device ID included in the received room exit notice to delete a record including the identified application user ID from game situation information DB 323. After deleting the record, game situation managing unit 317 sends a room exit notice notifying that the user has exited a room, to communication terminal 20 running game support program P2 associated with game device 10.

Associating unit 318, on receiving a request sent from game device 10 or communication terminal 20, stores, in user information DB 321, a record including a device ID, an application user ID, a management-purpose user ID, and a user name.

1-1-5. Configuration of Game Server 40

Game server 40 is a computer device for enabling users of game devices 10 to perform multi-play of battle game G. Game server 40, on receiving room entry requests from game devices 10, matches game devices 10 sharing a room ID included in received room entry requests, so that the matched game devices can perform multi-play of battle game G.

1-1-6. Configuration of Voice Chat Server 50

Voice chat server 50 is a computer device for enabling users of communication terminals 20 to perform a voice chat. Voice chat server 50, on receiving voice chat start requests from communication terminals 20, matches communication terminals 20 sharing a set of a room ID and a channel ID, included in received voice chat start requests, so that users of the matched communication terminals can perform a voice chat.

1-2. Operation

Two operations performed by communication system 1: one being an operation for inviting another user to join a multi-play activity, and the other being a multi-play operation, will be described. As for the latter operation, specifically, an operation for inviting another user by use of communication program P3, an operation for inviting a friend, and an operation for inviting another user with whom a user has performed a multi-play activity will be described.

1-2-1. Invitation Operation 1-2-1-1. Invitation Operation Using Communication Program P3

Figure 10:
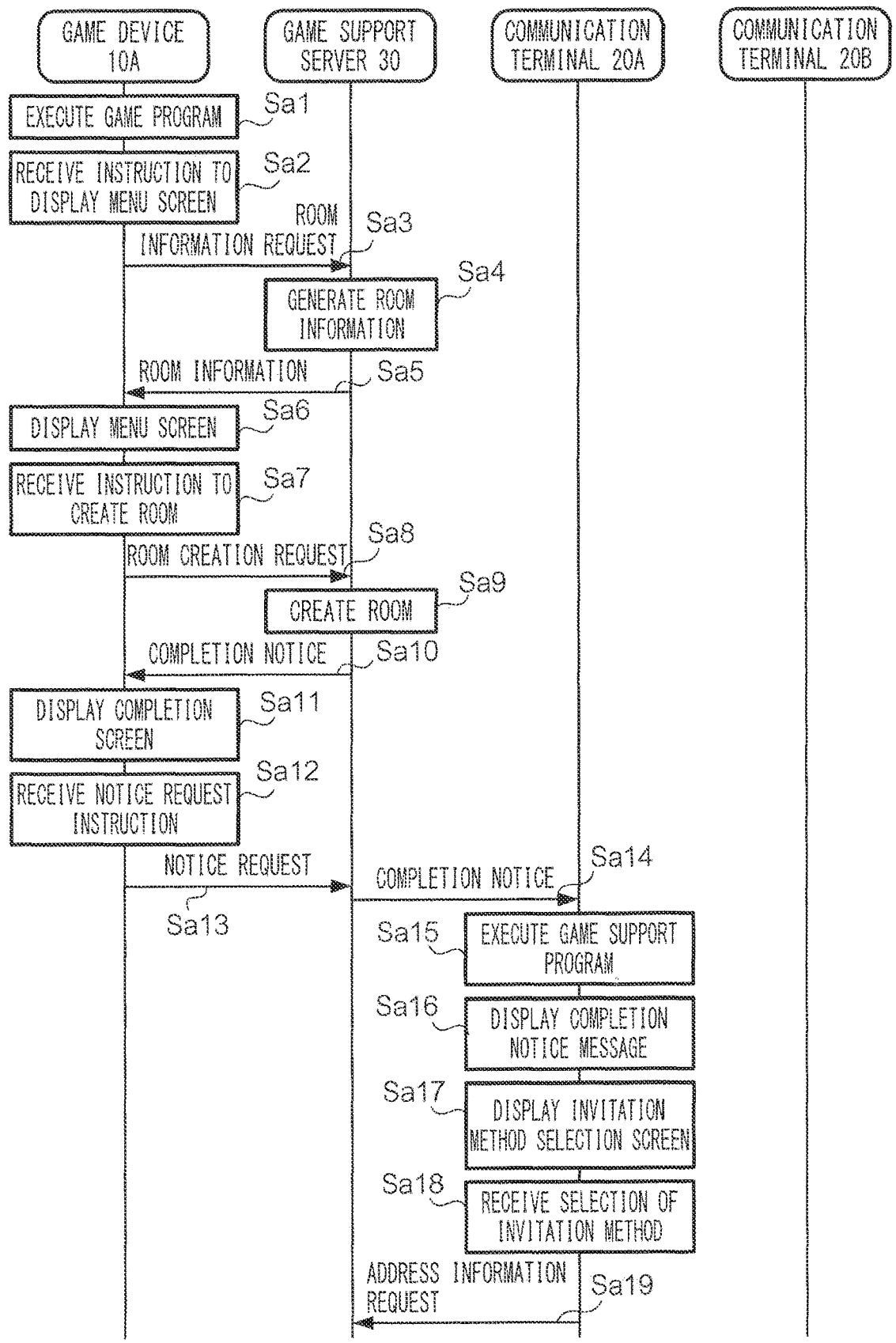
FIG. 10 is a sequence diagram showing an example of an invitation operation using communication program P3.
Figure 11:
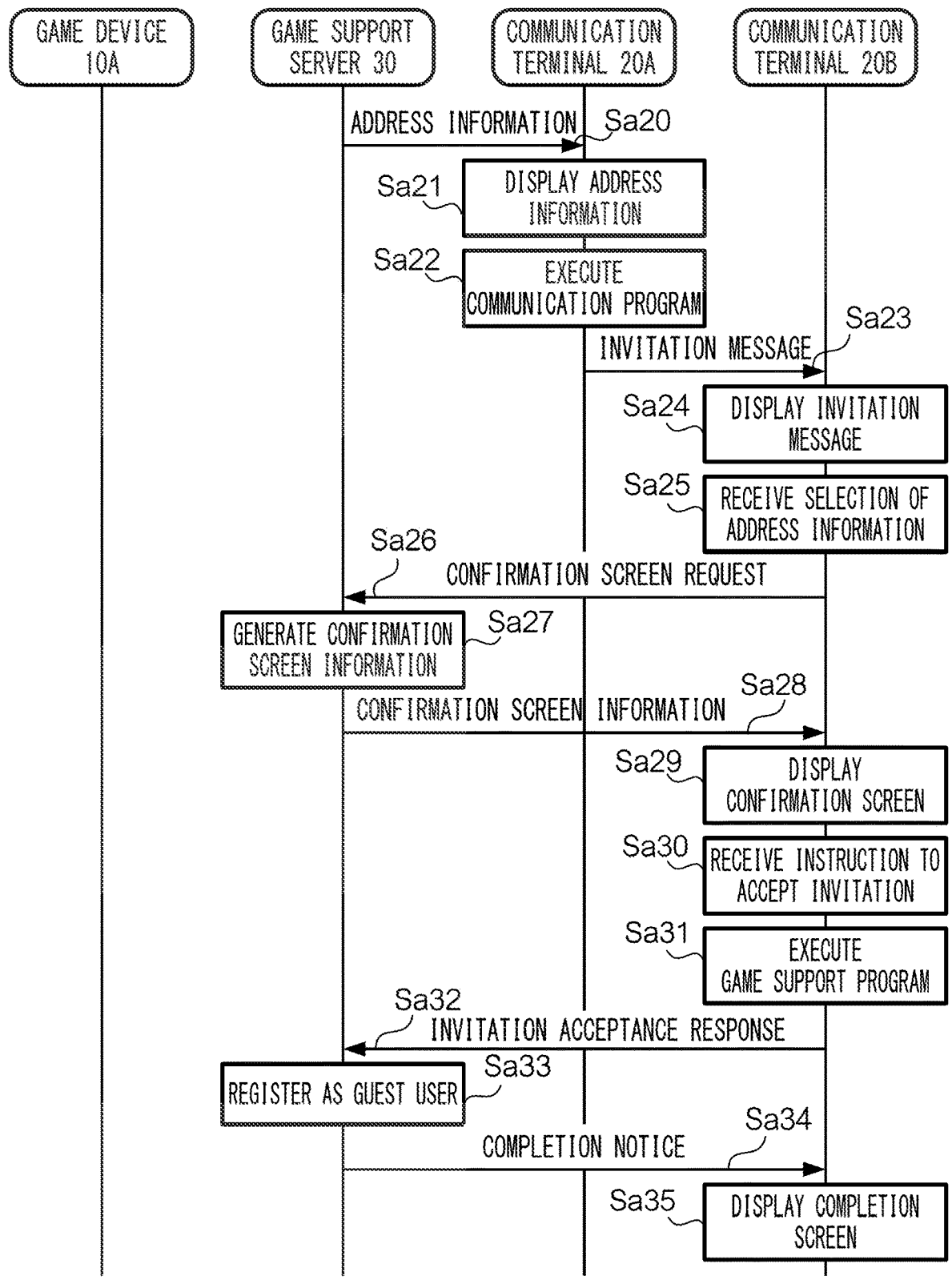
FIG. 11 is a sequence diagram showing an example of an invitation operation using communication program P3.

FIGS. 10 and 11 are sequence diagrams showing an example of an invitation operation using communication program P3. In the following description, a case is assumed that user A of game device 10A and communication terminal 20A invites user B of game device 10B and communication terminal 20B to join multi-play of battle game G.

Figure 12:
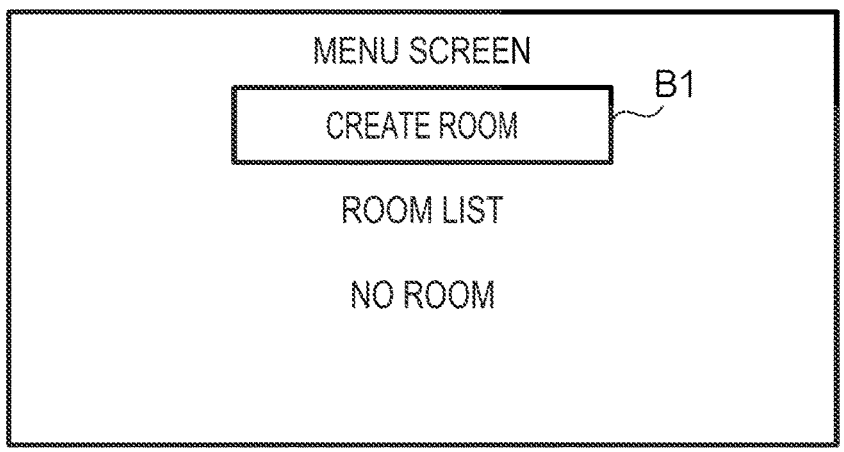
FIG. 12 is a diagram showing an example of a menu screen.

Control unit 11 of game device 10A, on receiving a user A's instruction to execute game program P1, executes the game program stored in storage unit 12 (step Sa1). After game program P1 is executed, on receiving an instruction to display a menu screen from user A wishing to create a room (step Sa2), menu screen display control unit 111 sends a room information request including a device ID of game device 10A to game support server 30 (step Sa3). On receiving the room information request, room information generating unit 311 of game support server 30 generates room information with reference to room information DB 322 (step Sa4) to send the generated room information to game device 10A (step Sa5). On receiving the room information, menu screen display control unit 111 of game device 10A causes display unit 13 to display a menu screen based on the received room information (step Sa6). FIG. 12 is a diagram showing an example of the menu screen, which includes room creation button B1 and a room list. In the menu screen, since no room has been created, and user A has not received any invitation, the room list includes no room name.

Figure 13:
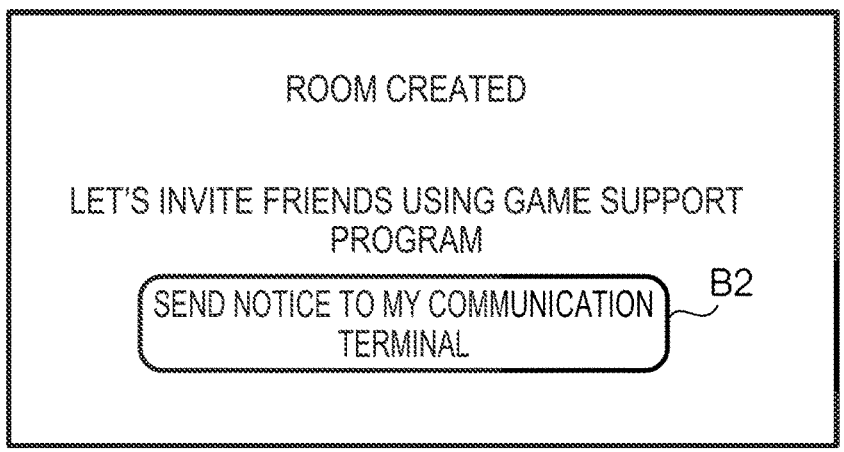
FIG. 13 is a diagram showing an example of a completion screen.

On receiving a user A's selection of room creation button B1 on the menu screen (step Sa7), room creation requesting unit 112 sends a room creation request including a device ID of game device 10A to game support server 30 (step Sa8). On receiving the room creation request, room creating unit 312 of game support server 30 creates a room (step Sa9). After creating the room, room creating unit 312 sends a completion notice notifying that a room has been created, to game device 10A (step Sa10). On receiving the completion notice, room creation requesting unit 112 of game device 10A causes display unit 13 to display a completion screen notifying that a room has been created (step Sa11). FIG. 13 is a diagram showing an example of the completion screen, which includes a message notifying that a room has been created, and notice request button B2 used to request that a similar notice be sent to communication terminal 20A running game support program P2 associated with game device 10A.

Figure 14:
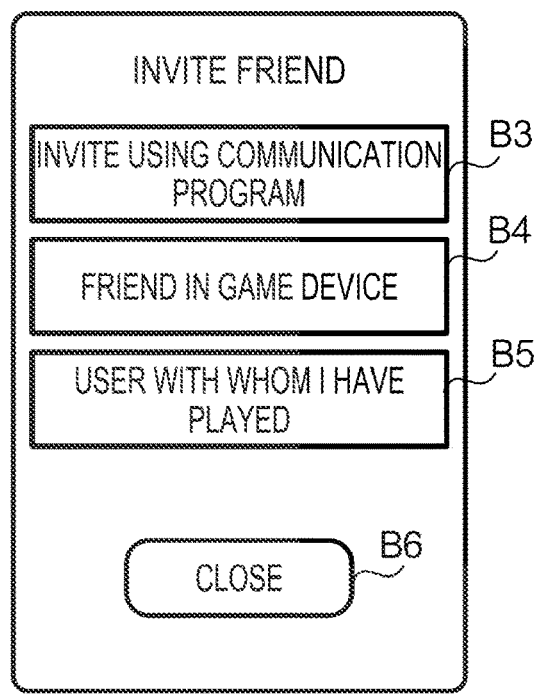
FIG. 14 is a diagram showing an example of an invitation method selection screen.

On receiving a user A's selection of notice request button B2 on the completion screen (step Sa12), room creation requesting unit 112 sends a notice request including the device ID of game device 10A to game support server 30 (step Sa13). On receiving the notice request, room creating unit 312 of game support server 30 sends a completion notice including a room ID of the created room to communication terminal 20A as a push notification (step Sa14). On receiving the completion notice, control unit 21 of communication terminal 20A, if game support program P2 is not running, executes the game support program stored in storage unit 22 (step Sa15). Completion notice display control unit 211 causes display unit 23 to display a message notifying that a room has been created, and prompting user A to invite another user to the created room (step Sa16). Subsequently, on receiving a user A's input operation, for example, to select the message, completion notice display control unit 211 causes display unit 23 to display an invitation method selection screen (step Sa17). FIG. 14 is a diagram showing an example of the invitation method selection screen, which includes selection button B3 used to select an invitation using communication program P3, selection button B4 used to select an invitation of a friend, selection button B5 used to select an invitation of another user with whom user A has performed a multi-play activity, and close button B6.

On receiving a user A's selection of selection button B3 on the invitation method selection screen (step Sa18), first inviting unit 212 sends an address information request including a room ID received from game support server 30 to the game support server (step Sa19). On receiving the address information request, access information notifying unit 313 of game support server 30 sends requested address information to communication terminal 20A with reference to room information DB 322 (step Sa20). It is to be noted that, in a modification, access information notifying unit 313 may generate the address information after receiving the address information request from communication terminal 20A. On receiving the address information from game support server 30, first inviting unit 212 of communication terminal 20A causes display unit 23 to display the received address information (step Sa21). After the address information is displayed, on receiving a user A's instruction to execute communication program P3, control unit 21 of communication terminal 20A executes the communication program stored in storage unit 22 (step Sa22). Subsequently, on receiving a user A's instruction to notify the address information to communication terminal 20 used by user B, invitation information sending unit 217 sends an invitation message including the address information to communication terminal 20B (step Sa23). It is to be noted that, in a modification, first inviting unit 212 may start communication program P3 by use of a share function provided by an OS so that invitation information sending unit 217 generates an invitation message by pasting the address information into a message to send the generated invitation message to communication terminal 20B.

On receiving the invitation message, control unit 21 of communication terminal 20B causes display unit 23 to display the received invitation message (step Sa24). Subsequently, on receiving a user B's selection of the address information included in the invitation message (step Sa25), control unit 21 sends a request for a confirmation screen for confirming whether user B accepts the invitation, to game support server 30 based on the selected address information (step Sa26). On receiving the confirmation screen request, control unit 31 of game support server 30 generates requested confirmation screen information with reference to room information DB 322 (step Sa27) to send the generated confirmation screen information to communication terminal 20B, together with the room ID (step Sa28). On receiving the confirmation screen information, control unit 21 of communication terminal 20B causes display unit 23 to display a confirmation screen (step Sa29). On receiving a user B's input operation indicating his/her intention to accept the invitation (step Sa30), control unit 21, if game support program P2 is not running, executes the game support program stored in storage unit 22 (step Sa31). Invitation receiving unit 213 sends an invitation acceptance response including the room ID received from game support server 30 and an application user ID of user B to the game support server (step Sa32). On receiving the invitation acceptance response, invited user registering unit 316 of game support server 30 registers user B as a guest user in the room of user A in room information DB 322 (step Sa33). Specifically, invited user registering unit 316 stores in room information DB 322, a set of the room ID and the application user ID, included in the received invitation acceptance response. After registering user B as a guest user, invited user registering unit 316 sends a completion notice notifying that user B has been registered as a guest user, to communication terminal 20B (step Sa34). On receiving the completion notice, invitation receiving unit 213 of communication terminal 20B causes display unit 23 to display a completion screen notifying that user B has been registered as a guest user (step Sa35). It is to be noted that, in a modification, invited user registering unit 316, in parallel with step Sa34, may provide a notification that user B has accepted the invitation, to communication terminal 20A used by user A.

The foregoing is a description of an invitation operation using communication program P3.

It is to be noted that, in the foregoing description of an invitation operation, user A, who is a host user who requests creating a room, invites another user, user B, to the room; however, invited user B may invite another user to the room. In that case, user B may invoke an invitation method selection screen in communication terminal 20B to carry out steps Sa17 to Sa23.

1-2-1-2. Friend Invitation Operation

Figure 15:
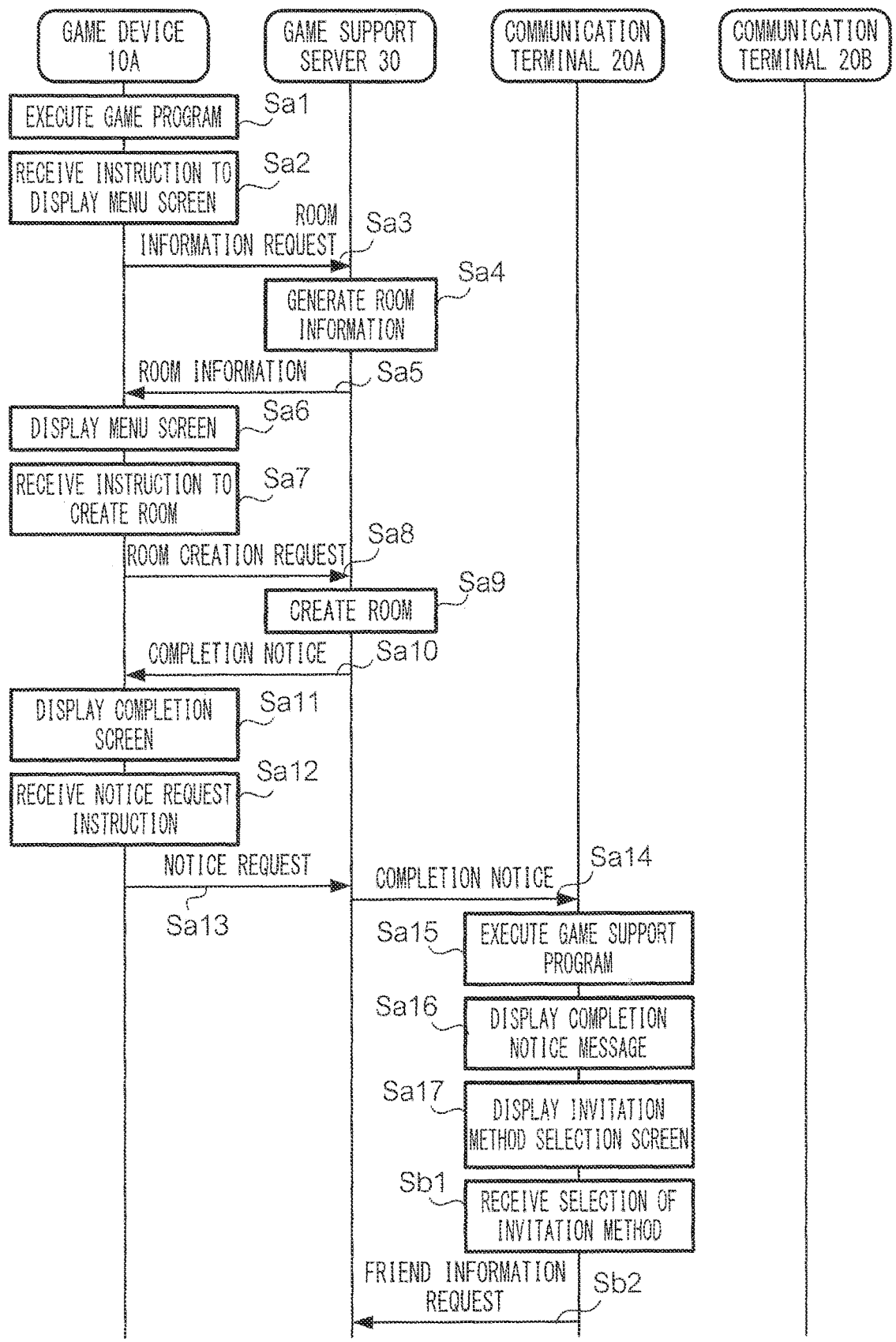
FIG. 15 is a sequence diagram showing an example of a friend invitation operation.
Figure 16:
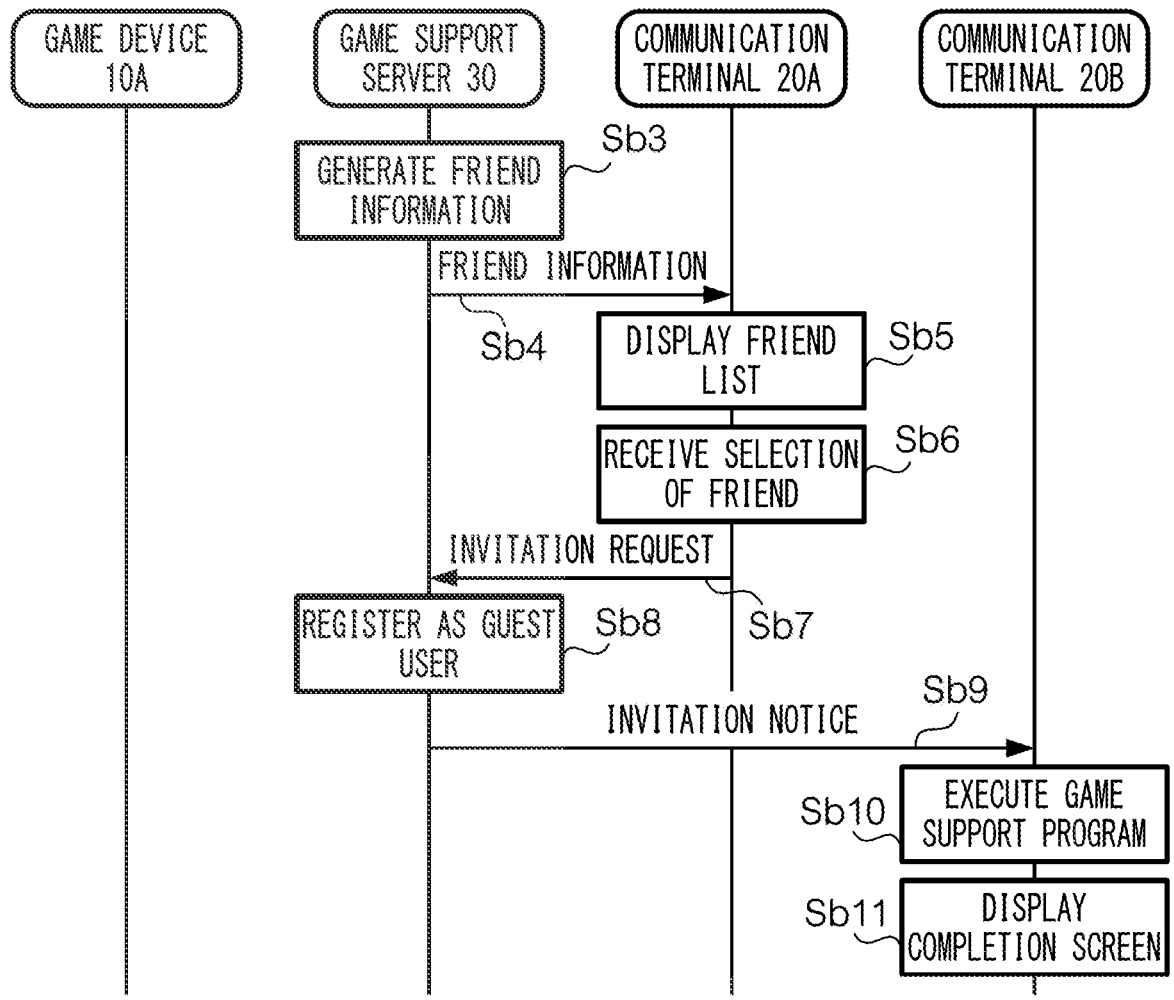
FIG. 16 is a sequence diagram showing an example of a friend invitation operation.

FIGS. 15 and 16 are sequence diagrams showing an example of a friend invitation operation. In the following description, a case is assumed that user A of game device 10A and communication terminal 20A and user B of game device 10B and communication terminal 20B are friends, and that user A invites user B to join multi-play of battle game G. It is to be noted that since steps Sa1 to Sa17 of the friend invitation operation are shared by the invitation operation using communication program P3, a description of these steps is omitted.

When user A of communication terminal 20A selects selection button B4 to invite a friend on an invitation method selection screen displayed at step Sa17 (step Sb1), second inviting unit 214 sends a friend information request including an application user ID of user A to game support server 30 (step Sb2). On receiving the friend information request, friend information generating unit 314 of game support server 30 generates friend information with reference to friend information DB 324 (step Sb3) to send the generated friend information to communication terminal 20A (step Sb4). On receiving the friend information, second inviting unit 214 causes display unit 23 to display a friend list (step Sb5). Subsequently, on receiving a user A's selection of user B (step Sb6), second inviting unit 214 sends an invitation request including an application user ID of selected user B and a room ID received from game support server 30 at step Sa14 to the game support server (step Sb7). On receiving the invitation request, invited user registering unit 316 of game support server 30 registers user B as a guest user for a room of user A in room information DB 322 (step Sb8). After registering user B as a guest user, invited user registering unit 316 sends an invitation notice notifying that user B has been registered as a guest user for a room of user A, to communication terminal 20B used by user B, as a push notification (step Sb9).

On receiving the completion notice, control unit 21 of communication terminal 20B, if game support program P2 is not running, executes the game support program stored in storage unit 22 (step Sb10). Completion notice display control unit 211 causes display unit 23 to display a message notifying that user B has been registered as a guest user in a room of user A (step Sb11).

The foregoing is a description of a friend invitation operation.

It is to be noted that, in the foregoing description of an invitation operation, user A, who is a host user who requests creating a room, invites another user, user B, to the room; however, invited user B may invite another user to the room. In that case, user B may invoke an invitation method selection screen in communication terminal 20B to carry out steps Sa17 and Sb1 to Sb7.

Figure 17:
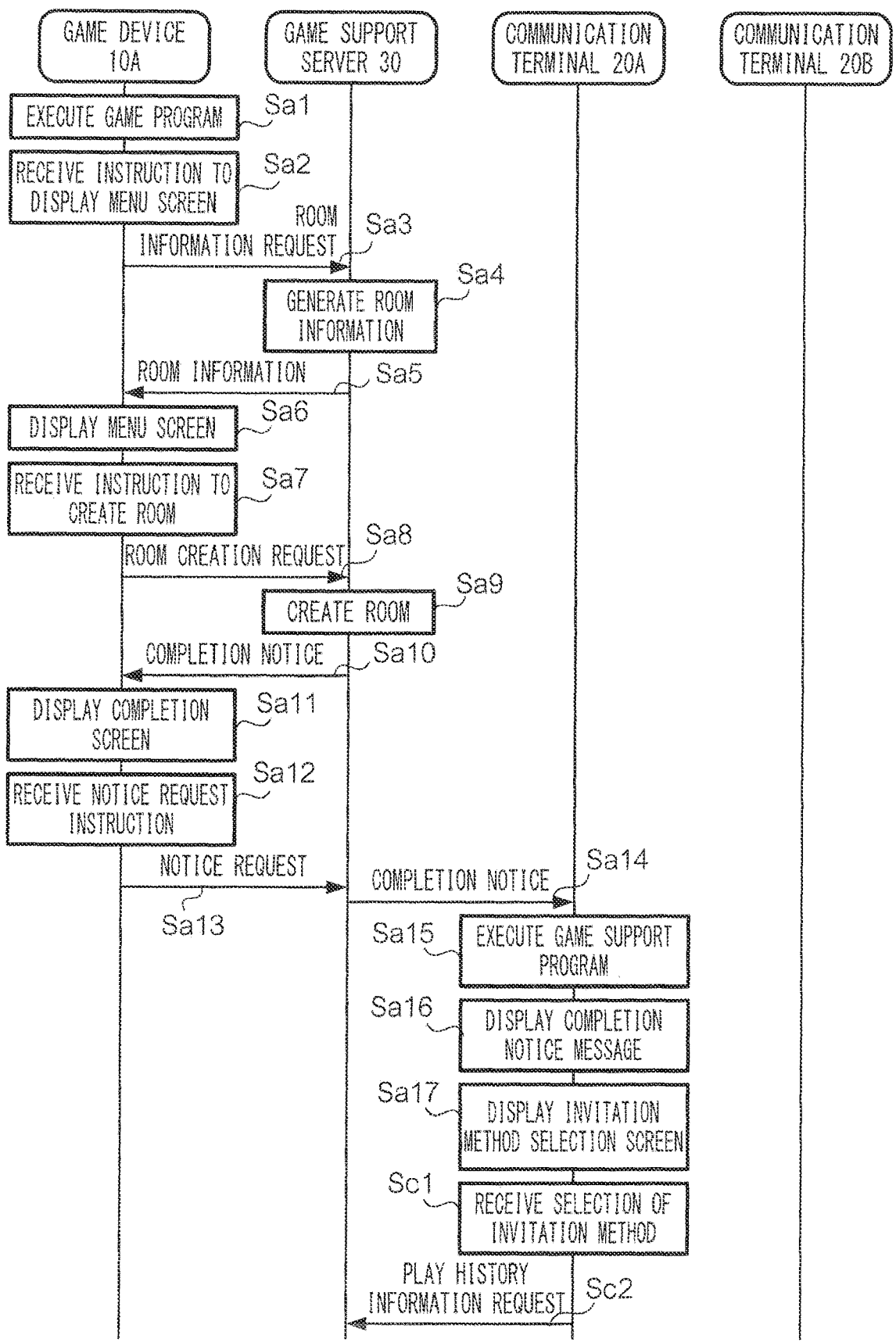
FIG. 17 is a sequence diagram showing an example of an operation for inviting another user with whom a user has played a multi-player game.
Figure 18:
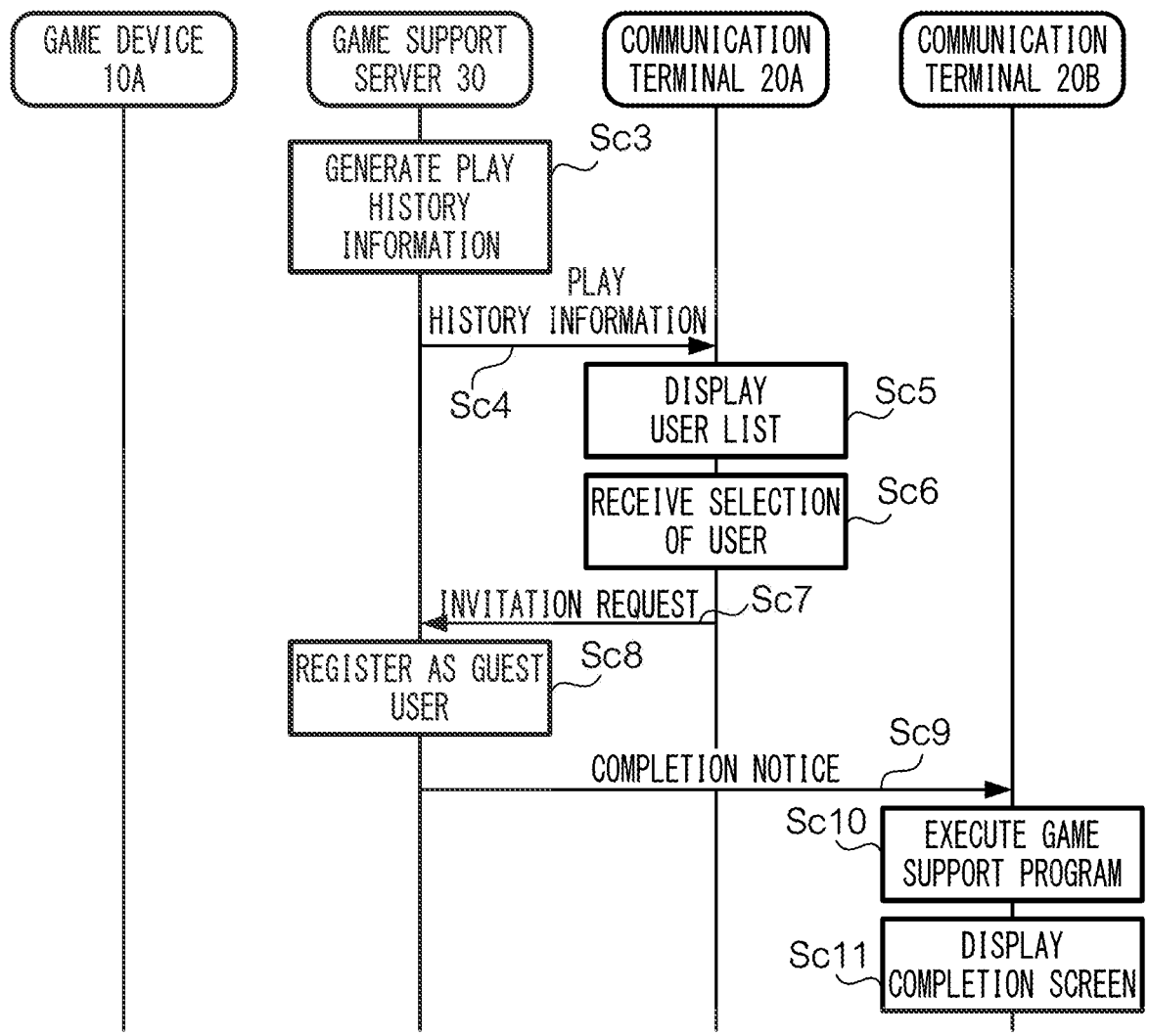
FIG. 18 is a sequence diagram showing an example of an operation for inviting another user with whom a user has played a multi-player game.

1-2-1-3. Operation for Inviting another User with whom a User Performed Multi-Play Activity FIGS. 17 and 18 are sequence diagrams showing an example of an operation for inviting another user with whom a user has performed a multi-play activity. In the following description, a case is assumed that user A of game device 10A and communication terminal 20A and user B of game device 10B and communication terminal 20B have performed a multi-play activity together, and that user A invites user B to join multi-play of battle game G. It is to be noted that, since steps Sa1 to Sa17 of the operation for inviting another user with whom a user has performed a multi-play activity are shared by the invitation operation using communication program P3, a description of these steps is omitted.

When user A of communication terminal 20A selects selection button B5 to invite another user with whom s/he has performed a multi-play activity on an invitation method selection screen displayed at step Sa17 (step Sc1), third inviting unit 215 sends a play history information request including an application user ID of user A to game support server 30 (step Sc2). On receiving the play history information request, play history information generating unit 315 of game support server 30 generates play history information with reference to multi-play history DB 325 (step Sc3) to send the generated play history information to communication terminal 20A (step Sc4). On receiving the play history information, third inviting unit 215 of communication terminal 20A causes display unit 23 to display a list of other users with whom user A has performed a multi-play activity (step Sc5). Subsequently, on receiving a user A's selection of user B (step Sc6), third inviting unit 215 sends an invitation request including an application user ID of selected user B and a room ID received from game support server 30 at step Sa14 to the game support server (step Sc7). On receiving the invitation request, invited user registering unit 316 of game support server 30 registers user B as a guest user for a room of user A in room information DB 322 (step Sc8). After registering user B as a guest user, invited user registering unit 316 sends an invitation notice notifying that user B has been registered as a guest user for a room of user A, to communication terminal 20B used by user B, as a push notification (step Sc9).

On receiving the completion notice, control unit 21 of communication terminal 20B, if game support program P2 is not running, executes the game support program stored in storage unit 22 (step Sc10). Completion notice display control unit 211 causes display unit 23 to display a message notifying that user B has been registered as a guest user for a room of user A (step Sc11).

The foregoing is a description of an operation for inviting another user with whom a user has performed a multi-play activity.

It is to be noted that, in the foregoing description of an invitation operation, user A, who is a host user who requests creating a room, invites another user, user B, to the room; however, invited user B may invite another user to the room. In that case, user B may invoke an invitation method selection screen in communication terminal 20B to carry out steps Sa17 and Sc1 to Sc7.

According to the three types of invitation operations described in the foregoing, by using communication terminal 20, a user is able to invite another user to join a multi-play activity or to be invited to join a multi-play activity. Accordingly, in a situation where a user does not have game device 10 at hand, or where a user's game device 10 is not connected to communication line 60, the user is able to invite another user to join a multi-play activity or to be invited to join a multi-play activity. Also, in another situation where a user to be invited does not have game device 10 at hand, or where game device 10 of a user to be invited is not connected to communication line 60, the user is able to be invited to join a multi-play activity. Especially, since in the above invitation operations, a room ID of a room created using game device 10 is notified to communication terminal 20 running game support program P2 associated with the game device, so that the communication terminal can extend an invitation, a user of the communication terminal does not need to input the room ID manually to notify it to another user to be invited.

Among the three types of invitation operations, especially, according to the invitation operation using communication program P3, a user is able to invite another user with whom the user has no relationship established by using game device 10, to join a multi-play activity. Specifically, a user is able to invite another user who is not registered as a friend to join a multi-play activity, without performing a procedure for establishing a friendship with the other user. Also, a user is able to invite another user with whom the user has not performed a multi-play activity to join a multi-play activity. In addition, a user who has received an invitation is able to accept the invitation by performing a simple selection operation. On the other hand, according to the friend invitation operation and the operation for inviting another user with whom a user has performed a multi-play activity, a user is able to select another user to be invited, with reference to information on other users registered using game device 10 associated with running game support program P2.

1-2-2. Multi-Play Operation

Figure 19:
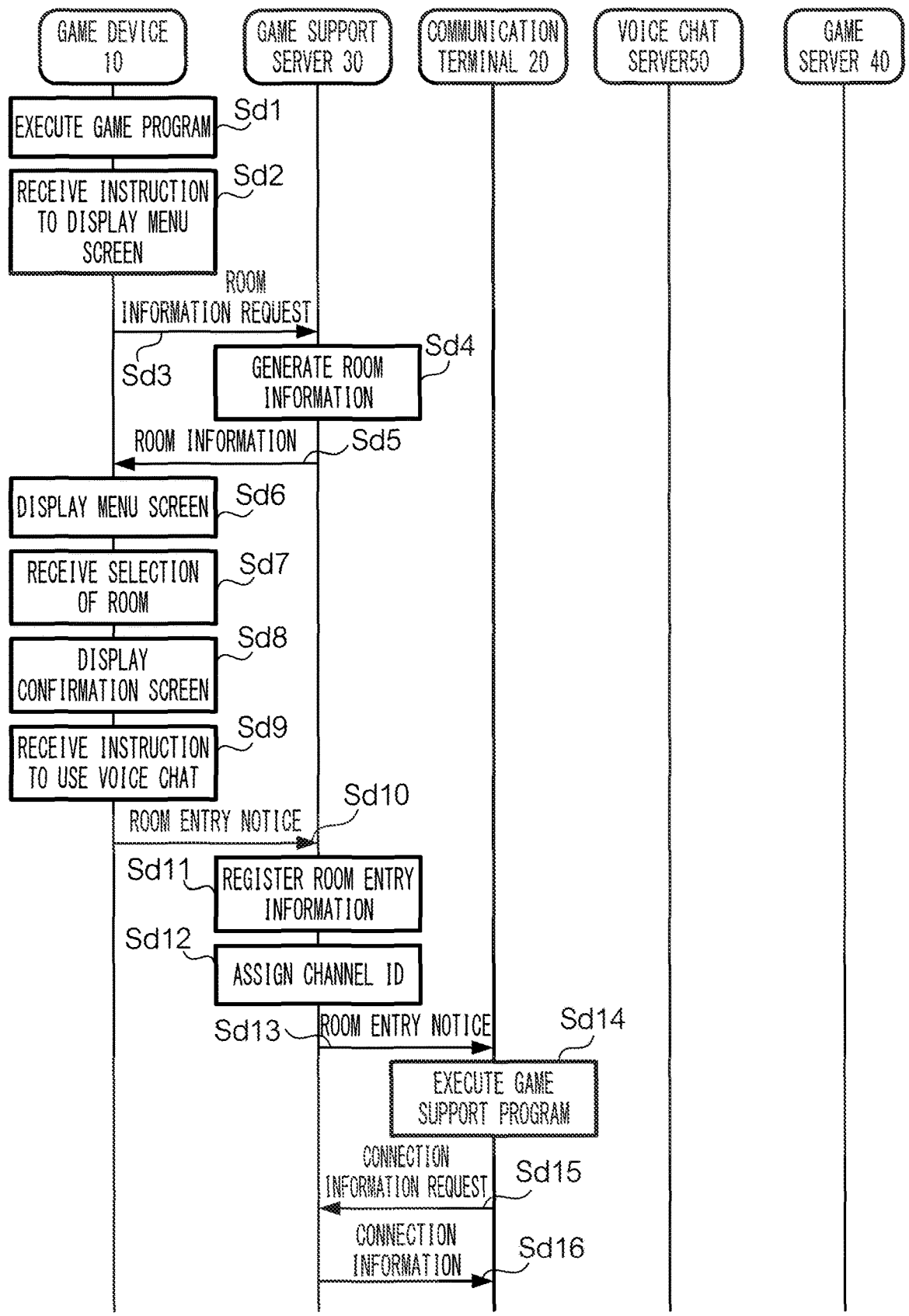
FIG. 19 is a sequence diagram showing an example of a multi-play operation.
Figure 20:
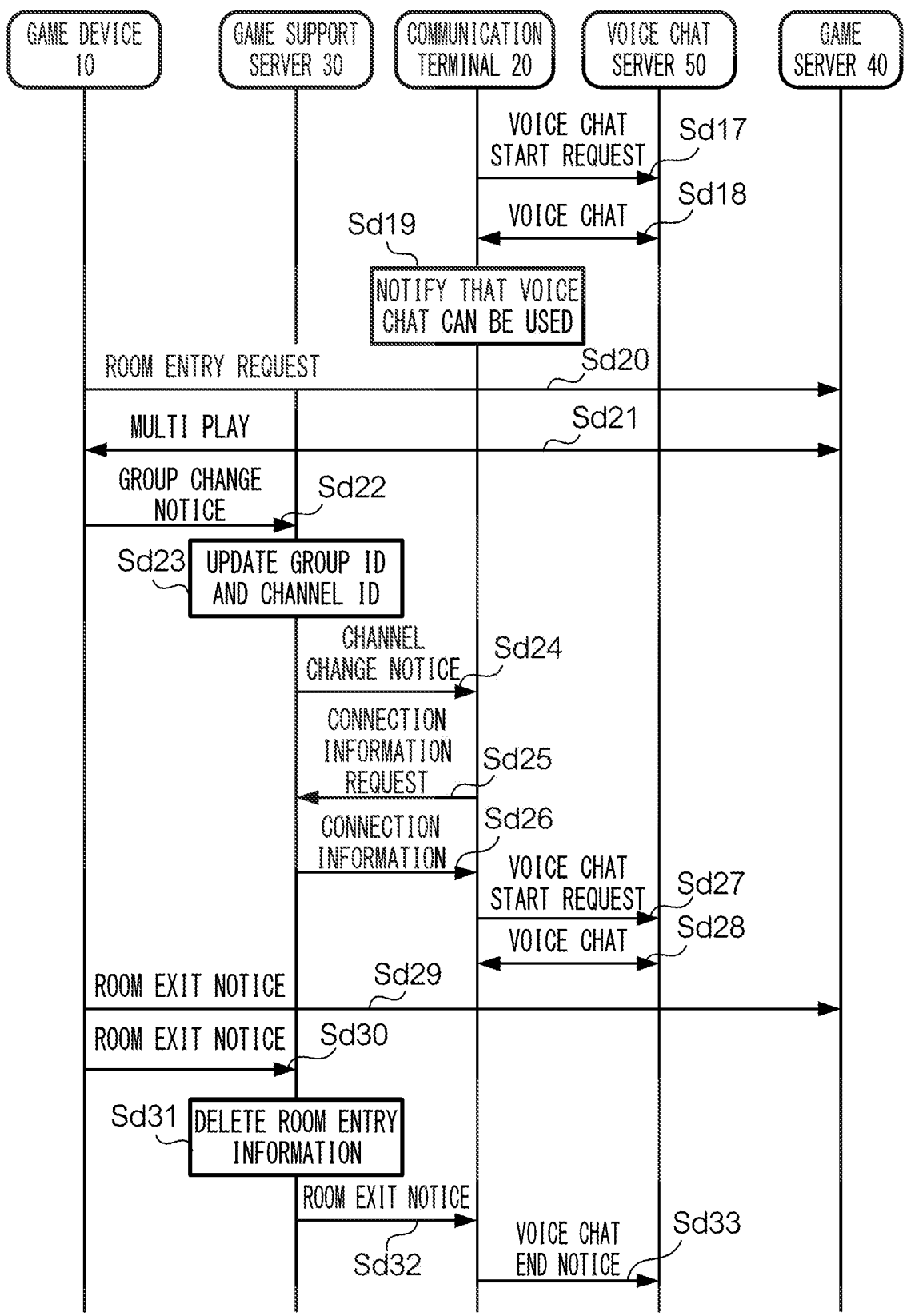
FIG. 20 is a sequence diagram showing an example of a multi-play operation.

FIGS. 19 and 20 are sequence diagrams showing an example of a multi-play operation, which enables an automatic grouping for voice chat based on a grouping performed in multi-player battle game G.

Figure 21:
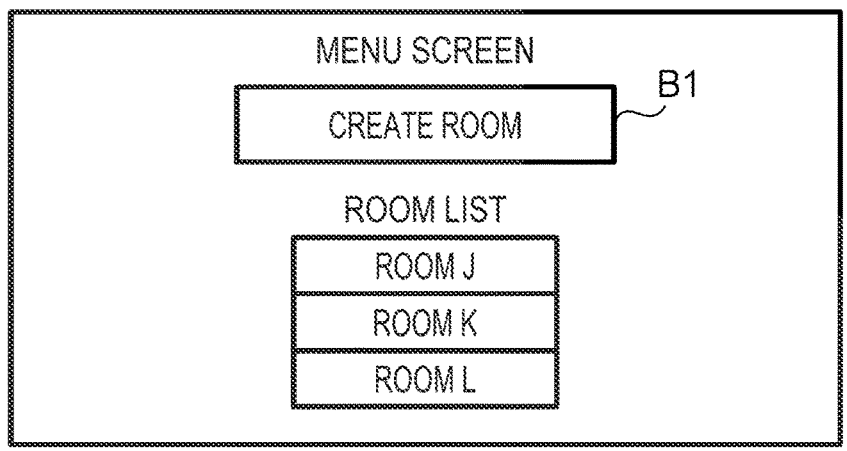
FIG. 21 is a diagram showing an example of a menu screen.

Control unit 11 of game device 10, on receiving a user's instruction to execute game program P1, executes the game program stored in storage unit 12 (step Sd1). After game program P1 is executed, on receiving a user's instruction to display a menu screen to select a room (step Sd2), menu screen display control unit 111 sends a room information request including a device ID of game device 10 to game support server 30 (step Sd3). On receiving the room information request, room information generating unit 311 of game support server 30 generates room information with reference to room information DB 322 (step Sd4) to send the generated room information to game device 10 (step Sd5). On receiving the room information, menu screen display control unit 111 of game device 10 causes display unit 13 to display a menu screen based on the received room information (step Sd6). FIG. 21 is a diagram showing an example of the menu screen, which includes room creation button B1 and a room list.

On receiving a user's selection of a desired room on the menu screen (step Sd7), menu screen display control unit 111 causes display unit 13 to display a confirmation screen for confirming whether the user wishes to use a voice chat (step Sd8). After the confirmation screen is displayed, on receiving a user's input operation requesting use of a voice chat (step Sd9), game situation notifying unit 113 sends a room entry notice including a room ID of the selected room and the device ID of game device 10 to game support server 30 (step Sd10). On receiving the room entry notice, game situation managing unit 317 of game support server 30 registers, in game situation information DB 323, information indicating that the user of game device 10 has entered the selected room (step Sd11). Also, game situation managing unit 317 assigns a channel ID "ch0" to the user (step Sd12). Subsequently, game situation managing unit 317 sends a room entry notice including a room ID of the room that the user has entered, and the channel ID assigned to the user, to communication terminal 20 running game support program P2 associated with game device 10, as a push notification (step Sd13).

On receiving the room entry notice, control unit 21 of communication terminal 20, if game support program P2 is not running, executes the game support program stored in storage unit 22 (step Sd14). Voice chat executing unit 216 sends a connection information request including an application user ID of the user to game support server 30 (step Sd15). On receiving the connection information request, game situation managing unit 317 of game support server 30 sends requested connection information to communication terminal 20 with reference to game situation information DB 323 (step Sd16). On receiving a user's input operation requesting start of a voice chat, voice chat executing unit 216 of communication terminal 20 sends a voice chart start request including a set of the room ID and the channel ID, included in the received room entry notice, and the application user ID of the user to voice chat server 50 by use of received connection information (step Sd17). On receiving the voice chat start request, voice chat server 50 matches communication terminals 20 sharing a set of a room ID and a channel ID so that the matched communication terminals are able to perform a voice chat (step Sd18). After sending the voice chat start request, voice chat executing unit 216 causes display unit 23 to display a message notifying that voice chat has become available (step Sd19).

In parallel with step Sd10, game executing unit 114 of game device 10 sends a room entry request including the room ID of the room that the user has entered, and the device ID of the game device game server 40 (step Sd20). On receiving the room entry request, game server 40 matches game devices 10 sharing a room ID so that the matched game devices can perform multi-play of battle game G (step Sd21).

After a match starts, upon detecting necessity of a change of a channel ID, game situation notifying unit 113 of game device 10 sends a group change notice including the device ID of the game device to game support server 30 (step Sd22). On receiving the group change notice, game situation managing unit 317 of game support server 30 updates a set of the group ID and the channel ID, stored in game situation information DB 323, based on the received group change notice (step Sd23). Subsequently, game situation managing unit 317 sends a channel change notice notifying that a channel ID has changed, to communication terminal 20 running game support program P2 associated with game device 10 (step Sd24). On receiving the channel change notice, voice chat executing unit 216 of communication terminal 20 sends a connection information request including the application user ID of the user to game support server 30 (step Sd25). On receiving the connection information request, game situation managing unit 317 of game support server 30 sends required connection information to communication terminal 20 with reference to game situation information DB 323 (step Sd26). On receiving the connection information, voice chat executing unit 216 of communication terminal 20 sends a voice chart start request including the room ID of the room in which the user is present, a channel ID included in the channel change notice, and the application user ID of the user to voice chat server 50 by use of the received connection information (step Sd27). On receiving the voice chat start request, voice chat server 50 matches communication terminals 20 sharing a set of a room ID and a channel ID so that the matched communication terminals are able to perform a voice chat (step Sd28).

Steps Sd22 to Sd28 described in the foregoing are carried out each time in battle game G a grouping of users is performed or a match ends.

On receiving a user's instruction to end a multi-play activity, game executing unit 114 of game device 10 sends a room exit notice including the room ID of the room in which the user is present and the device ID of the game device to game server 40 (step Sd29). In parallel with the step, game situation notifying unit 113 sends a similar notice to game support server 30 (step Sd30). On receiving the room exit notice, game situation managing unit 317 of game support server 30 deletes a record of the user of game device 10 from game situation information DB 323 (step Sd31). Also, game situation managing unit 317 sends a room exit notice, notifying that the user has exited a room, to communication terminal 20 running game support program P2 associated with game device 10 (step Sd32). On receiving the room exit notice, voice chat executing unit 216 of communication terminal 20 sends, after a lapse of a predetermined time period (for example, three minutes), a voice chat end notice including the application user ID of the user to voice chat server 50 (step Sd33) to end a voice chat.

The foregoing is a description of a multi-play operation.

Figure 22:
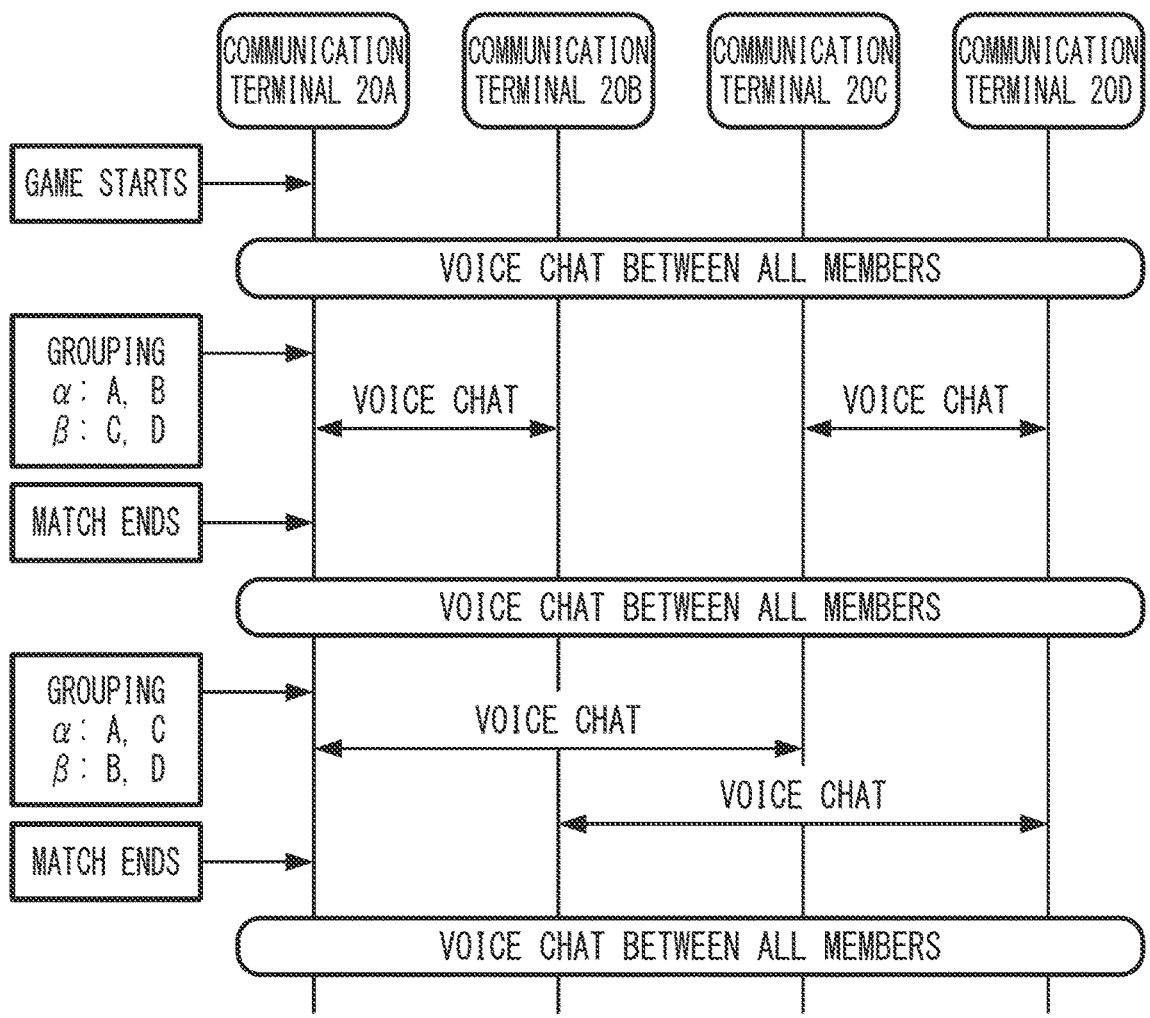
FIG. 22 is a diagram showing an example of grouping for voice chat.

Now, an example of grouping for voice chat performed during a multi-play operation carried out by sets of game device 10 and communication terminal 20 will be described. FIG. 22 is a diagram showing such an example of grouping for voice chat, in which it is assumed that users A to D of communication terminals 20A to 20D perform multi-play of battle game G.

Immediately after a multi-play activity starts, since all users A to D are assigned a channel ID "ch0," a voice chat is performed among all communication terminals 20A to 20D.

Subsequently, when a grouping of users A to D is performed prior to start of a first match so that users A and B belong to group alfa and users C and D belong to group beta, users A and B are assigned a channel ID "ch1" and users C and D are assigned a channel ID "ch2" so that a voice chat is performed between communication terminals 20A and 20B and another voice chat is performed between communication terminals 20C and 20D.

After the first match ends, since all users A to D are assigned a channel ID "ch0" again, a voice chat is performed among all communication terminals 20A to 20D.

Subsequently, when a grouping of users A to D is performed prior to start of a second match so that users A and C belong to group alfa and users B and D belong to group beta, users A and C are assigned a channel ID "ch1" and users B and D are assigned a channel ID "ch2" so that a voice chat is performed between communication terminals 20A and 20C and another voice chat is performed between communication terminals 20B and 20D.

After the second match ends, since all users A to D are assigned a channel ID "ch0" again, a voice chat is performed among all communication terminal 20A to 20D.

The foregoing is a description of an example of grouping for voice chat.

According to the multi-play operation described in the foregoing, a user is able to perform a voice chat by use of communication terminal 20; accordingly, although game device 10 includes no microphone, a user is able to perform a voice chat during a multi-play activity. If game device 10 includes a microphone, by performing a voice chat by use of communication terminal 20, a reduction in a load of processing speech information applied to the game device is possible.

Also, according to the multi-play operation, since a voice chat is performed using communication terminal 20 running game support program P2 associated with game device 10, synchronizing start (or end) of a voice chat with start (or end) of a multi-play activity is possible. Also, it is possible to automatically perform a grouping for voice chat based on a grouping performed in battle game G so that users share information on a group basis.

2. Modification

The above embodiment may be modified as described below. Two or more of the following modifications may be combined with each other.

2-1. Modification 1

Game device 10 may be a stationary game device, instead of a portable game device. Game device 10 may be a terminal that is always connected to communication line 60, instead of a terminal that is not always connected to communication line 60. Game device 10 may not necessarily be a dedicated game machine. A "game device" according to an exemplary embodiment includes an information-processing device capable of running a game program, such as a smartphone, a tablet device, or a personal computer.

2-2. Modification 2

After a multi-play activity ends, game device 10 may send information on the multi-play activity to game support server 30, and the game support server may forward the information to communication terminal 20 running game support program P2 associated with the game device. Information on a multi-play activity herein refers to, for example, performance data indicating a result of a multi-play activity or image data indicating a game screen (or a screen shot) captured automatically or manually during a multi-play activity.

2-3. Modification 3

Communication terminal 20 may be a stationary computer device, instead of a portable computer device. Communication terminal 20 may be a terminal that is not always connected to communication line 60, instead of a terminal that is always connected to communication line 60.

2-4. Modification 4

Communication terminal 20, instead of or in addition to game device 10, may request game support server 30 to create a room. In that case, control unit 21 of communication terminal 20 additionally provides a function of a room creation requesting unit by executing game support program P2. The room creation requesting unit, in accordance with a user's instruction, sends a room creation request including an application user ID to game support server 30. Subsequently, on receiving a completion notice sent from game support server 30, notifying that a room has been created, and including a room ID of a created room, the room creation requesting unit causes display unit 23 to display a completion screen notifying that a room has been created.

2-5. Modification 5

Communication terminal 20 may perform, instead of a voice chat, real-time communication such as a video chat, a text chat, or communication using pre-defined sentences or images, with another communication terminal 20. In that case, game situation managing unit 317 of game support server 30 may perform a grouping for communication based on a grouping performed in battle game G, as in the case of a voice chat. It is to be noted that "communication" according to an exemplary embodiment includes not only transmission of a voice or text message transmitted by a user, but also exchange of data such as control information between terminals.

2-6. Modification 6

Communication terminal 20 may perform a peer-to-peer voice chat with another communication terminal 20, without voice chat server 50. In that case, communication terminal 20 may enable group-by-group information sharing by outputting only speech information received from communication terminals 20 sharing a room ID and a channel ID with the communication terminal.

2-7. Modification 7

Room information DB 322 of game support server 30 associates a room ID with application user IDs of a host user and guest users; however, the room information DB may associate a room ID with management-purpose user IDs, instead of application user IDs. In that case, room creating unit 312, on receiving a room creation request sent from game device 10, identifies, by referring to user information DB 321, a management-purpose user ID corresponding to a device ID included in the received room creation request, and stores, in room information DB 322, the identified management-purpose user ID, a room ID, a room name, and address information in association with each other. Invited user registering unit 316, on receiving an invitation acceptance response or invitation request sent from communication terminal 20, identifies, by referring to user information DB 321, a management-purpose user ID corresponding to an application user ID included in the received information, to store, in room information DB 322, the identified management-purpose user ID in association with a room ID.

2-8. Modification 8

Friend information DB 324 of game support server 30 may manage device IDs and user names of other users followed by a user (or other users (followers) following a user), in addition to or instead of friend information. Following a user herein refers to registering another user to automatically acquire messages posted by the other user. Following of a user can come into effect based on an agreement by one user, unlike a friend registration.

2-9. Modification 9

Game support server 30, on receiving a room entry notice from game device 10, may notify communication terminals 20 used by other users belonging to the same room as a user of the game device, that the user has entered the room. Specifically, game support server 30 may identify, by referring to room information DB 322, application user IDs of other users associated with an application user ID of a user who has entered a room, and send a message notifying that the user has entered the room, to communication terminals 20 used by the other users identified by the identified application user IDs, as a push notification.

2-10. Modification 10

During a multi-play activity, game support server 30 may not necessarily receive a group change notice from all game devices 10. Game support server 30 may receive, from only one of game devices 10 engaged in a multi-play activity, a group change notice including group IDs of all users.

Alternatively, game support server 30 may receive a group change notice from game server 40, instead of game device 10.

2-11. Modification 11

During a multi-play activity, game support server 30 may change a method of communication performed among communication terminals 20, depending on a situation of the multi-play activity. For example, immediately after a multi-play activity starts and before a grouping is performed, game support server 30 may enable communication terminal 20 to perform a video chat (or a text chat), after a grouping is performed and before a match ends, the game support server may enable communication terminal 20 to perform a voice chat, and after the match ends and before another grouping is performed, the game support server may enable communication terminal 20 to perform a video chat (or a text chat) again.

2-12. Modification 12

In a case where users play a multi-player battle game that is different from battle game Gin that users play in individual competitions, not team competitions, game support server 30 may perform a grouping for a voice chat depending on a situation of the game such as a performance in the game, instead of a grouping performed in the game. A performance in the game herein refers to, for example, a ranking in a match. In that case, game situation managing unit 317 of game support server 30 receives a group change notice sent from game device 10, including information on performances in the game, to update performance information stored in game situation information DB 323 based on the received group change notice. Also, game situation managing unit 317 assigns, based on updated performance information, a new channel ID to a user of communication terminal 20 running game support program P2 associated with game device 10, to update a channel ID stored in game situation information DB 323 with the new channel ID. When doing so, game situation managing unit 317 assigns the new channel ID so that users not ranked first in a previous match share a channel ID so that they can perform a voice chat. By performing a voice chat, the users can smoothly cooperate with each other, which smooth cooperation increases the chance for the users to improve their performance in the game. Game situation managing unit 317 performs the above operation each time the unit receives a group change notice from game device 10, so that each time a performance in the game changes, a channel ID, namely, grouping of voice chat, changes.

It is to be noted that performances in a game indicated by performance information may be an overall ranking that is assigned based on results of plural matches, not a ranking in a single match. It is also to be noted that a number of highly ranked users, and not only a user ranked first, may be excluded from a voice chat group.

2-13. Modification 13

In a case where users play a multi-player game that is different from battle game G in genre, such as a role-playing game, game support server 30 may perform a grouping for a voice chat depending on a situation of the game such as a progress of the game, instead of a grouping performed in the game. A progress of the game herein refers to, for example, a stage or area of a game, or a location of a character operated by a user. In that case, game situation managing unit 317 of game support server 30 receives a group change notice sent from game device 10, including information on a progress of the game, to update progress information stored in game situation information DB 323 based on the received group change notice. Also, game situation managing unit 317 assigns, based on updated progress information, a new channel ID to a user of communication terminal 20 running game support program P2 associated with game device 10, to update a channel ID stored in game situation information DB 323 with the new channel ID. When doing so, game situation managing unit 317 assigns the new channel ID so that users in a room whose respective progress in the game is identical or similar (for example, users operating characters positioned in an identical area or in adjacent areas within a game space) share a channel ID so that they can perform a voice chat. Game situation managing unit 317 performs the above operation each time the unit receives a group change notice from game device 10, so that each time a progress of the game changes, a channel ID, namely, grouping of voice chat, changes.

2-14. Modification 14

In a case where users play a multi-player game that is different from battle game G in genre, such as a role-playing game, game support server 30 may change a sound volume during a voice chat from one user to another depending on a situation of the game such as a progress of the game. A progress of the game herein refers to, for example, a stage or area of a game, or a location of a character operated by a user. In that case, in step Sd23 of the above multi-play operation, game situation managing unit 317 of game support server 30 receives a group change notice sent from game device 10, including information on a progress of the game, to update progress information stored in game situation information DB 323 based on the received group change notice. Also, game situation managing unit 317, for a user of communication terminal 20 running game support program P2 associated with game device 10, identifies application user IDs of other users whose sound volume should be controlled, based on updated progress information, to store the identified application user IDs in game situation information DB 323. When doing so, game situation managing unit 317 identifies application user IDs of other users in a room whose respective progress in the game is identical or similar to that of the user (for example, other users operating characters positioned in an area identical or adjacent to that of the user's character within a game space). After identifying the application user IDs, game situation managing unit 317, at step Sd24, sends the identified application user IDs to communication terminal 20 running game support program P2 associated with game device 10 as speech control target information. On receiving the speech control target information, communication terminal 20 that outputs a speech based on speech information received from voice chat server 50, varies a sound volume of speeches of users identified by the received speech control target information from those of other users. For example, communication terminal 20 increases a sound volume of speeches of the users as compared with those of other users so that the speech of the users whose progress in the game is identical or similar to the user can be heard more easily. Game situation managing unit 317 performs the above operation each time the unit receives a group change notice from game device 10, so that each time a progress of the game changes, volume control targets change.

It is to be noted that in a case where the present modification is employed, steps Sd25 to Sd28 of the above multi-play operation are omitted.

2-15. Modification 15

Game device 10 may be provided with a microphone, a speaker, and storage unit 12 storing game support program P2, to enable the game device to include the functions provided in communication terminal 20.

2-16. Modification 16

The programs executed in game device 10, communication terminal 20, and game support server 30 may be distributed using a computer-readable non-transitory storage medium, which includes a magnetic storage medium such as a magnetic tape or a magnetic disk, an optical storage medium such as an optical disk, a magneto-optical storage medium, or a semi-conductor memory. Alternatively, the program may be distributed via a network such as the Internet.

What is claimed is:

1. A system comprising:
one or more servers that include memory and at least one hardware processor that is configured to:
communicate with a plurality of computing devices to conduct a multi-player video game that includes multiple matches, wherein players for each match are separated into at least two different gameplay groups;
automatically allocate, for each match of the multiple matches, each one of the players to one of a plurality of different voice communication channels, wherein players in different gameplay groups are allocated to different voice communication channels, wherein each one of the players is automatically allocated into one of the plurality of different voice communication channels prior to a start of the match;
during each match, control voice communication between the players according to how the players have been allocated into the plurality of different voice communication channels; and
based on completion of each match of the multiple matches, automatically allocate players from a respective match to a common communication channel to thereby allow communication.

2. The system of claim 1, wherein the common communication channel is a text-based communication channel.

3. The system of claim 1, wherein the at least one hardware processor is further configured to:
receive audio data that is transmitted from different ones of the plurality of computing devices; and
transmit the received audio data to those computing devices that are associated with others players that have been allocated to the same voice communication channel as the player who provided corresponding audio data.

4. The system of claim 1, wherein different ones of the players are allocated to different ones of the voice communication channels over successive ones of the multiple matches.

5. The system of claim 1, wherein each player can perform voice communication prior to start of the match in accordance with which one of the plurality of different voice communication channels the player has been allocated to.

6. The system of claim 1, wherein the one or more servers includes a first server and a second server, wherein the first server assigns each of the players into the at least two different gameplay groups,
wherein a second computer server allocates the players to the plurality of different voice communication channels.

7. The system of claim 6, wherein the first server communicates an update message that causes the second computer server to allocate at least one player to a voice channel that is different from a prior voice channel for that at least one player.

8. The system of claim 1, wherein the at least one hardware processor is further configured to:
communicate, to each of the plurality of computing devices, at least one identifier that indicates how a corresponding player has been allocated to one of a plurality of different voice communication channels.

9. The system of claim 8, wherein the at least one identifier includes a voice communication channel identifier and a group identifier.

10. The system of claim 1, further comprising:
a first computing device of the plurality of computing devices that each include at least one hardware processor, the at least one hardware processor of the first computing device configured to receive input from a corresponding player in connection with execution of a first computer process that is used by the corresponding player to play the multi-player video game.

11. The system of claim 10, wherein the at least one hardware processor of the first computing device is further configured to:
process, while the first computer process is executing and the match is being played, audio input of the corresponding player; and
cause audio data, which is based on the processed audio input, to be transmitted to other users that have been allocated to the same voice communication channel for the match.

12. The system of claim 11, wherein the at least one hardware processor of the first computing device is further configured to:
execute a second computer process that is separate from the first computer process, wherein the second computer process includes processing the audio input and causing the audio data to be transmitted.

13. The system of claim 10, further comprising a second computing device that includes at least one hardware processor that is configured to execute:
a second computer process;
as part of the second computer process and while the first computer process is executing on the first computing device, process audio input of the corresponding player while the match is being played via the first computing device; and
as part of the second computer process, cause audio data, which is based on the processed audio input, to be transmitted to other users that have been allocated to the same voice communication channel for the match.

14. The system of claim 13, wherein separation of players into different gameplay groups is synchronized with the automatic allocation of the players into the plurality of different voice communication channels.

15. The system of claim 14, wherein the second computing device is used to carry out the automatic allocation of the corresponding player to one of the plurality of different voice communication channels.

16. A non-transitory computer readable storage medium storing computer executable instructions for use by at least one hardware processor of a computing system, the stored computer executable instructions comprising instructions that, when executed by the at least one hardware processor of the computing system, cause the at least one hardware processor to perform operations comprising:
communicating with a plurality of computing devices to conduct a multi-player video game that includes multiple matches, wherein players for each match are separated into at least two different gameplay groups;
automatically allocating, for each match of the multiple matches, each one of the players to one of a plurality of different voice communication channels, wherein players in different gameplay groups are allocated to different voice communication channels, wherein each one of the players is automatically allocated into one of the plurality of different voice communication channels prior to a start of the match;
during each match, controlling voice communication between the players according to how the players have been allocated into the plurality of different voice communication channels; and based on completion of each match of the multiple matches, automatically allocating players from a respective match to a common communication channel to thereby allow communication.

17. A method performed on one or more computer servers, the method comprising:

communicating with a plurality of computing devices to conduct a multi-player video game that includes multiple matches, wherein players for each match are separated into at least two different gameplay groups;

automatically allocating, for each match of the multiple matches, each one of the players to one of a plurality of different voice communication channels, wherein players in different gameplay groups are allocated to different voice communication channels, wherein each one of the players is automatically allocated into one of the plurality of different voice communication channels prior to a start of the match;

during each match, controlling voice communication between the players according to how the players have been allocated into the plurality of different voice communication channels; and based on completion of each match of the multiple matches, automatically allocating players from a respective match to a common communication channel to thereby allow communication.

* * * * *